(12) United States Patent
Jones et al.

(10) Patent No.: US 11,774,927 B2
(45) Date of Patent: Oct. 3, 2023

(54) METHODS AND APPARATUS TO PROVIDE A ROLE-BASED USER INTERFACE

(71) Applicant: FISHER-ROSEMOUNT SYSTEMS, INC., Round Rock, TX (US)

(72) Inventors: Bryan Michael Jones, Cedar Park, TX (US); Cindy A. Scott, Georgetown, TX (US); Molly Marie Firkins, Cedar Park, TX (US); Dan Halver Ussing, Georgetown, TX (US); James R. Balentine, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 1068 days.

(21) Appl. No.: 14/574,025

(22) Filed: Dec. 17, 2014

(65) Prior Publication Data

US 2015/0105878 A1   Apr. 16, 2015

Related U.S. Application Data

(63) Continuation-in-part of application No. 14/048,844, filed on Oct. 8, 2013, now Pat. No. 10,444,949.

(Continued)

(51) Int. Cl.
*G05B 15/02* (2006.01)
*G06F 3/0484* (2013.01)
(Continued)

(52) U.S. Cl.
CPC ......... *G05B 15/02* (2013.01); *G05B 19/4188* (2013.01); *G06F 3/0484* (2013.01);
(Continued)

(58) Field of Classification Search
CPC ............... G05B 15/02; G05B 19/4188; G05B 2219/31472; G05B 2219/32128;
(Continued)

(56) References Cited

U.S. PATENT DOCUMENTS 5,241,624 A    8/1993  Torres
5,564,007 A   10/1996  Kazen-Goudarzi et al.
(Continued)

FOREIGN PATENT DOCUMENTS

CN    1313966 A    9/2001
CN    1702582 A   11/2005
(Continued)

OTHER PUBLICATIONS

Search Report for Application No. GB1521910.8, dated Jun. 2, 2016.
(Continued)

*Primary Examiner* — Justin R. Blaufeld
(74) *Attorney, Agent, or Firm* — MARSHALL, GERSTEIN & BORUN LLP

(57) ABSTRACT

Methods and apparatus to provide a role-based user interface are disclosed herein. An example system disclosed includes a display device to depict a user interface. The example system also includes a processor. The example processor is to receive object information for an object in a process control system during a session, determine a user role based on the session, determine whether the object information is qualifying information based on the user role, and display the object information via the user interface when the object information is qualifying information.

20 Claims, 13 Drawing Sheets

Related U.S. Application Data

(60) Provisional application No. 61/711,105, filed on Oct. 8, 2012, provisional application No. 61/711,110, filed on Oct. 8, 2012.

(51) Int. Cl.
  *G06F 9/445* (2018.01)
  *G05B 19/418* (2006.01)

(52) U.S. Cl.
  CPC ............... *G06F 9/44505* (2013.01); *G05B 2219/25067* (2013.01); *G05B 2219/31418* (2013.01); *G05B 2219/31467* (2013.01); *G05B 2219/31472* (2013.01); *G05B 2219/32128* (2013.01); *Y02P 90/02* (2015.11)

(58) Field of Classification Search
  CPC ........... G05B 2219/31418; G05B 2219/31467; G05B 2219/25067; G06F 9/44505; G06F 3/0484; Y02P 90/02
  See application file for complete search history.

(56) References Cited

U.S. PATENT DOCUMENTS

| | | |
|---|---|---|
| 5,777,616 A | 7/1998 | Bates et al. |
| 5,812,394 A | 9/1998 | Lewis et al. |
| 5,950,201 A | 9/1999 | Van Huben et al. |
| 6,014,612 A | 1/2000 | Larson et al. |
| 6,211,877 B1 | 4/2001 | Steele et al. |
| 6,282,175 B1 | 8/2001 | Steele et al. |
| 6,577,323 B1 | 6/2003 | Jamieson et al. |
| 6,839,852 B1 | 1/2005 | Pantuso et al. |
| 6,942,143 B1 | 9/2005 | Iida et al. |
| 6,975,966 B2 | 12/2005 | Scott et al. |
| 6,990,652 B1 | 1/2006 | Parthasarathy et al. |
| 7,010,450 B2 | 3/2006 | Law et al. |
| 7,030,747 B2 | 4/2006 | Scott et al. |
| 7,043,311 B2 | 5/2006 | Nixon et al. |
| 7,089,530 B1 | 8/2006 | Dardinski et al. |
| 7,110,835 B2 | 9/2006 | Blevins et al. |
| 7,117,052 B2 | 10/2006 | Lucas et al. |
| 7,146,231 B2 | 12/2006 | Schleiss et al. |
| 7,237,109 B2 | 6/2007 | Scott et al. |
| 7,272,815 B1 | 9/2007 | Eldridge et al. |
| 7,330,768 B2 | 2/2008 | Scott et al. |
| 7,389,204 B2 | 6/2008 | Eryurek et al. |
| 7,421,458 B1 | 9/2008 | Taylor et al. |
| 7,526,347 B2 | 4/2009 | Lucas et al. |
| 7,647,126 B2 | 1/2010 | Blevins et al. |
| 7,680,546 B2 | 3/2010 | Gilbert et al. |
| 7,729,789 B2 | 6/2010 | Blevins et al. |
| 7,783,370 B2 | 8/2010 | Nixon et al. |
| 7,890,927 B2 | 2/2011 | Eldridge et al. |
| 7,904,821 B1 | 3/2011 | Tertitski et al. |
| 7,984,420 B2 | 7/2011 | Eldridge et al. |
| 8,028,272 B2 | 9/2011 | Eldridge et al. |
| 8,028,275 B2 | 9/2011 | Eldridge et al. |
| 8,060,222 B2 | 11/2011 | Eldridge et al. |
| 8,065,131 B2 | 11/2011 | McDonald et al. |
| 8,065,202 B1 | 11/2011 | Ballaro et al. |
| 8,127,060 B2 | 2/2012 | Doll et al. |
| 8,127,241 B2 | 2/2012 | Blevins et al. |
| 8,135,481 B2 | 3/2012 | Blevins et al. |
| 8,225,271 B2 | 7/2012 | Eldridge et al. |
| 8,229,579 B2 | 7/2012 | Eldridge et al. |
| 8,368,640 B2 | 2/2013 | Dardinski et al. |
| 8,473,917 B2 | 6/2013 | Weatherhead et al. |
| 8,896,603 B2 | 11/2014 | Hammack et al. |
| 9,043,003 B2 | 5/2015 | Campney et al. |
| 9,164,647 B2 | 10/2015 | Ueno et al. |
| 9,792,004 B2 | 10/2017 | Hammack et al. |
| 10,139,812 B2 | 11/2018 | Jones et al. |
| 2002/0161772 A1 | 10/2002 | Bergelson et al. |
| 2003/0236576 A1 | 12/2003 | Resnick et al. |
| 2004/0075689 A1 | 4/2004 | Schleiss et al. |
| 2004/0153804 A1 | 8/2004 | Blevins et al. |
| 2004/0186927 A1 | 9/2004 | Eryurek et al. |
| 2004/0201602 A1 | 10/2004 | Mody et al. |
| 2004/0260408 A1 | 12/2004 | Scott et al. |
| 2005/0027376 A1 | 2/2005 | Lucas et al. |
| 2005/0027377 A1 | 2/2005 | Lucas et al. |
| 2005/0096872 A1 | 5/2005 | Blevins et al. |
| 2005/0125787 A1 | 6/2005 | Tertitski et al. |
| 2005/0251380 A1 | 11/2005 | Calvert et al. |
| 2006/0015195 A1 | 1/2006 | Lehman et al. |
| 2006/0071067 A1 | 4/2006 | Iida |
| 2006/0117268 A1 | 6/2006 | Talley et al. |
| 2006/0206860 A1 | 9/2006 | Dardinski et al. |
| 2006/0206866 A1 | 9/2006 | Eldrige et al. |
| 2007/0005266 A1 | 1/2007 | Blevins et al. |
| 2007/0132779 A1 | 6/2007 | Gilbert et al. |
| 2007/0139441 A1 | 6/2007 | Lucas et al. |
| 2007/0150081 A1 | 6/2007 | Nixon et al. |
| 2007/0156264 A1 | 7/2007 | Schleiss et al. |
| 2007/0165031 A1 | 7/2007 | Gilbert et al. |
| 2007/0168060 A1 | 7/2007 | Nixon et al. |
| 2007/0168065 A1 | 7/2007 | Nixon et al. |
| 2007/0168174 A1 | 7/2007 | Davari et al. |
| 2007/0171921 A1 | 7/2007 | Wookey et al. |
| 2007/0174225 A1 | 7/2007 | Blevins et al. |
| 2007/0208549 A1 | 9/2007 | Blevins et al. |
| 2008/0066004 A1 | 3/2008 | Blevins et al. |
| 2008/0163164 A1* | 7/2008 | Chowdhary ............ G06Q 10/06 717/106 |
| 2008/0188960 A1 | 8/2008 | Nixon et al. |
| 2008/0189638 A1 | 8/2008 | Mody et al. |
| 2009/0024656 A1 | 1/2009 | Wellman |
| 2009/0088875 A1* | 4/2009 | Baier ............... G05B 19/41865 700/83 |
| 2009/0118845 A1 | 5/2009 | Eldridge et al. |
| 2009/0118846 A1 | 5/2009 | Eldridge et al. |
| 2009/0125128 A1 | 5/2009 | Eldridge et al. |
| 2009/0125129 A1 | 5/2009 | Eldridge et al. |
| 2009/0125130 A1 | 5/2009 | Eldridge et al. |
| 2009/0125131 A1 | 5/2009 | Eldridge et al. |
| 2009/0132996 A1 | 5/2009 | Eldridge et al. |
| 2009/0177543 A1 | 7/2009 | Ram et al. |
| 2009/0210386 A1 | 8/2009 | Cahill |
| 2009/0217200 A1 | 8/2009 | Hammack et al. |
| 2010/0017746 A1 | 1/2010 | Husoy et al. |
| 2010/0082554 A1 | 4/2010 | Beatty et al. |
| 2010/0168874 A1 | 7/2010 | Lucas et al. |
| 2010/0188410 A1 | 7/2010 | Gilbert et al. |
| 2010/0191554 A1* | 7/2010 | Singh ................. G06Q 10/063 705/7.11 |
| 2010/0222899 A1 | 9/2010 | Blevins et al. |
| 2010/0222902 A1 | 9/2010 | Eldridge et al. |
| 2010/0223593 A1 | 9/2010 | Eldridge et al. |
| 2010/0228373 A1 | 9/2010 | Lucas et al. |
| 2010/0235767 A1 | 9/2010 | Hammack et al. |
| 2010/0275139 A1 | 10/2010 | Hammack et al. |
| 2010/0305720 A1 | 12/2010 | Doll et al. |
| 2010/0305721 A1 | 12/2010 | Kostadinov et al. |
| 2011/0016099 A1 | 1/2011 | Peer et al. |
| 2011/0029102 A1 | 2/2011 | Campney et al. |
| 2011/0230980 A1 | 9/2011 | Hammack et al. |
| 2012/0029661 A1 | 2/2012 | Jones et al. |
| 2012/0030089 A1 | 2/2012 | Ram et al. |
| 2012/0041570 A1 | 2/2012 | Jones et al. |
| 2012/0198547 A1* | 8/2012 | Fredette ................ G06F 8/34 726/19 |
| 2012/0215464 A1* | 8/2012 | Daubney ................ G01K 17/06 702/24 |
| 2013/0125007 A1 | 5/2013 | Chaudhri et al. |
| 2013/0145279 A1 | 6/2013 | Ricci |
| 2013/0145297 A1 | 6/2013 | Ricci et al. |
| 2013/0346908 A1 | 12/2013 | Zhang |
| 2014/0075371 A1* | 3/2014 | Carmi ................ G06F 11/3438 715/781 |
| 2014/0088776 A1* | 3/2014 | Brandt ................ H02J 3/32 700/295 |
| 2014/0100668 A1 | 4/2014 | Jundt et al. |
| 2014/0100669 A1 | 4/2014 | Hammack et al. |

(56) References Cited

U.S. PATENT DOCUMENTS

| | | |
|---|---|---|
| 2014/0100676 A1 | 4/2014 | Scott et al. |
| 2014/0108985 A1 | 4/2014 | Scott et al. |
| 2014/0250420 A1 | 9/2014 | Smith et al. |
| 2014/0270888 A1 | 9/2014 | Yeum |
| 2015/0105878 A1 | 4/2015 | Jones et al. |
| 2015/0106753 A1 | 4/2015 | Tran et al. |

FOREIGN PATENT DOCUMENTS

| | | |
|---|---|---|
| CN | 1716137 A | 1/2006 |
| CN | 1950761 A | 4/2007 |
| CN | 1950771 A | 4/2007 |
| CN | 101095131 A | 12/2007 |
| CN | 102013045 A | 4/2011 |
| CN | 102033747 A | 4/2011 |
| CN | 102043403 A | 5/2011 |
| CN | 102419578 A | 4/2012 |
| CN | 102819425 A | 12/2012 |
| EP | 0 816 998 A2 | 1/1998 |
| EP | 2 482 186 A1 | 8/2012 |
| EP | 2 608 025 A1 | 6/2013 |
| EP | 2 801 941 A1 | 11/2014 |
| GB | 2 398 659 A | 8/2004 |
| JP | 02-208693 A | 8/1990 |
| JP | 06-309425 A | 11/1994 |
| JP | 11-282655 A | 10/1999 |
| JP | 2000-222184 A | 8/2000 |
| JP | 2001-195255 A | 7/2001 |
| JP | 2004-85243 A | 3/2004 |
| JP | 2004-133900 A | 4/2004 |
| JP | 2005-339494 A | 12/2005 |
| JP | 2006-252145 A | 9/2006 |
| JP | 2007-034456 A | 2/2007 |
| JP | 2007-157039 A | 6/2007 |
| JP | 2007-536648 A | 12/2007 |
| JP | 2008-118068 A | 5/2008 |
| JP | 2009-199597 A | 9/2009 |
| JP | 2010-257464 A | 11/2010 |
| JP | 2010-266915 A | 11/2010 |
| JP | 2011-118493 A | 6/2011 |
| JP | 2012-504291 A | 2/2012 |
| JP | 2012-73993 A | 4/2012 |
| JP | 2012-103978 A | 5/2012 |
| JP | 2015-536843 A | 12/2015 |
| WO | WO-2010/037145 A2 | 4/2010 |
| WO | WO-2014/058889 A1 | 4/2014 |

OTHER PUBLICATIONS

Examination Report for Application No. GB1505495.0, dated Sep. 30, 2015.
International Preliminary Report on Patentability for Application No. PCT/US2013/063914, dated Apr. 8, 2015.
International Preliminary Report on Patentability for Application No. PCT/US2013/063894, dated Apr. 8, 2015.
International Search Report and Written Opinion for Application No. PCT/US2013/063894, dated Jan. 7, 2014.
International Search Report and Written Opinion for Application No. PCT/US2013/063914, dated Jan. 22, 2014.
Examination Report for Application No. GB1505495.0, dated Sep. 28, 2016.
Office Action for Chinese Application No. 201380063079.6, dated Sep. 1, 2016.
Office Action for Chinese Application No. 201380063079.6, dated Jan. 23, 2017.
Office Action for Chinese Application No. 201380064166.3, dated May 2, 2017.
Office Action for Chinese Application No. 201380064166.3, dated Sep. 7, 2016.
Combined Search and Examination Report for Application No. GB1917091.9, dated Mar. 5, 2020.
Decision of Dismissal of Amendment for Japanese Application No. 2015-536840, dated Jun. 4, 2019.
Decision of Refusal for Japanese Application No. 2015-246013, dated May 26, 2020.
Examination Report for Application No. GB1505494.3, dated Jan. 29, 2019.
Examination Report for Application No. GB1521910.8, dated Sep. 2, 2020.
Extended European Search Report for Application No. 18187614.5, dated Jan. 18, 2019.
Notice of Reasons for Rejection for Japanese Application No. 2015-246013, dated Nov. 12, 2019.
Notice of Reasons for Rejection for Japanese Application No. 2018-196323, dated Oct. 21, 2019.
Notice of Reasons for Rejection for Japanese Application No. 2018-196324, dated Oct. 21, 2019.
Notification of First Office Action for Chinese Application No. 201510947366.4, dated Jun. 21, 2019.
Office Action for Chinese Application No. 201611003855.5, dated Nov. 27, 2018.
Office Action for Chinese Application No. 201710969588.5, dated Jul. 22, 2019.
Office Action for European Application No. 18187614.5, dated Dec. 3, 2020.
Second Office Action for Chinese Application No. 201510947366.4, dated Mar. 11, 2020.
Second Office Action for Chinese Application No. 201611003855.5, dated Aug. 14, 2019.
Third Office Action for Chinese Application No. 201510947366.4, dated Sep. 2, 2020.
Third Office Action for Chinese Application No. 201611003855.5, dated Nov. 22, 2019.
Notice of Reasons for Rejection for Japanese Application No. 2015-536840, dated Jan. 9, 2018.
Notice of Reasons for Rejection for Japanese Application No. 2015-536843, dated Jan. 9, 2018.
Office Action for Chinese Application No. 201380063079.6, dated Aug. 2, 2017.
Office Action for Chinese Application No. 201380063079.6, dated Oct. 30, 2017.
Fourth Office Action for Chinese Application No. 201510947366.4, dated Mar. 25, 2021.
Notice of Reasons of Rejection for Japanese Application No. 2020-120245, dated Oct. 5, 2021.
Notice of Reasons of Rejection for Japanese Application No. 2020-188734, dated Dec. 7, 2021.

\* cited by examiner

METHODS AND APPARATUS TO PROVIDE A ROLE-BASED USER INTERFACE

RELATED APPLICATIONS

This application is a continuation-in-part of U.S. patent application Ser. No. 14/048,844, titled "Configurable Use Displays in a Process Control System" and filed on Oct. 8, 2013, which claims the benefit of U.S. Provisional Application No. 61/711,105, titled "Configurable Use Displays in a Process Control System" and filed on Oct. 8, 2012; and U.S. Provisional Application No. 61/711,110, titled "Process Plant Configurations Using Flexible Objects," and filed on Oct. 8, 2012. The entire disclosures of these applications are hereby incorporated by reference herein.

FIELD OF THE DISCLOSURE

This disclosure relates generally to process control systems, and, more particularly, to methods and apparatus to provide a role-based user interface.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices and then process this information to generate control signals to implement control routines, to make other process control decisions, and to initiate process control system alarms. In this manner, the process controllers may execute and coordinate control strategies using the field devices via the buses and/or other communication links communicatively coupling the field devices.

Process information from the field devices and the controllers may be made available a system including to one or more applications (i.e., software routines, programs, etc.) executed by an operator workstation (e.g., a processor-based system) to enable an operator to perform desired functions with respect to the process, such as viewing the current state of the process (e.g., via a graphical user interface), changing settings of a process control routine, evaluating the process, modifying the operation of the process (e.g., via a visual object diagram), viewing alarms generated by field devices and/or process controllers, simulating the operation of the process for the purpose of training personnel and/or evaluating the process, etc. Many process control systems also include one or more application stations. Typically, these application stations are implemented using a personal computer, workstation, or the like that is communicatively coupled to the controllers, operator workstations, and other systems within the process control system via a local area network (LAN).

In some known process control systems, one or more operation terminals and/or application stations may execute one or more software applications that perform campaign management functions, maintenance management functions, virtual control functions, diagnostic functions, real-time monitoring functions, safety-related functions, configuration functions, etc. within the process control system. In addition, some known process control systems provide one or more operation terminals and/or application stations including a graphical user interface that displays the process control information including alarms generated by controllers or devices within the process, values of process variables, values of quality parameters associated with the process, process fault detection information, and/or process status information.

With some known process control systems, one or more of the process control-related applications include user interface functionality to enable the application(s) to interact directly with, for example, an operating system (e.g., a Windows-based operating system) of an operator station or a terminal providing a graphical interface to the process control system. Thus, in these systems, the various applications and, in particular, the graphical user interface portions thereof interact directly and independently (e.g., independent of other applications) with the operating system of the operator station. The management of these of these relatively independent graphical interfaces (e.g., displays or windows) is complicated by the fact that each of the displays may provide a different type of information (e.g., graphical, textual, trends, alarms, etc.) at different times. Furthermore, different personnel may value the information displayed via the graphical interfaces differently. For example, a graphical interface for a diagnostics management application may display information that is unusable to the user, thereby resulting in an overly complicated display.

SUMMARY

Generally speaking, a software system for developing, monitoring, operating, and otherwise interacting with a process control environment provides role-dependent views of user interface to various users. More particularly, the software system may filter and organize engineering tools and information according to the role of the user in the corresponding organization ("organizational role" or simply "role"), which can be a production manager, a maintenance manager, a control system engineer, or an electrical and instrument engineer, to name just a few examples. More generally, an organizational role can correspond to any suitable set of responsibilities, access and other privileges, security clearance, skills the user is expected to have, etc. The software system then may provide the filtered information and tool selection to the user in a view that includes, for example, a certain user interface screen, several generations of user interface screens, a set of related user interface screen displayed simultaneously, etc. Thus, two users having different organization roles may see different selections and/or arrangements of software applications, libraries, assets, data trees, etc. upon logging in. Further, as these users make selections and invoke functions within the respective views, the computing environment may continue to filter and organize information according to the users' roles. As a result, users can find relevant information more quickly to facilitate taking appropriate corrective actions, performing analysis, and reducing potential human error associated with the cognitive overload (or stress) of having to discern between relevant information for their job role/task and unimportant data. In the context of a production plant environment, this saved time and reduction in human error can often save customers millions of dollars in lost production due to a mistake that results in lost production either due to a plant shutdown or product that does not meet specification. In extreme cases, the human error can result in the or loss of plant personnel or damage to expensive process equipment A role-dependent view may include any suitable number of user interface screens with such information as, for example, (i) a visualization including a process display, a dashboard, various faceplates, machine views, etc., (ii) a logic display depicting control modules, phases, recipes, calculations, functions, etc., (iii) an instructions or "knowledge" display including standard operating procedures, device manuals, material handling nodes, loop diagrams, etc., (iv) a business information display illustrating orders, equipment tracking, material consumption, electrical consumption, etc., (v) a system health display including equipment status data, device alerts, vibration data, etc., and (vi) input/output (I/O) display illustrating I/O devices and signals. As one example, when a control system engineer logs in, the software system may generate process displays and dashboards as part of visualizations, control modules, phase, calculations, and functions as part of logic displays, loop diagrams as part of knowledge displays, etc. On the other hand, when an electrical and instrument engineer logs in, the software system may generate device dashboards as art of visualizations, calculations as part of logic, and device manuals as part of knowledge displays. When a role-dependent view includes multiple screens, navigation between the screens also may be role-dependent: thus, for example, if the computing environment displays equipment status to both process control engineers and electrical and instrumentation engineers, the software system may provide a link (e.g., a button in the toolbar, an option in a pull-down menu, an icon displayed next to a unit of equipment) to an electrical and instrumentation engineer to directly navigate to equipment tracking, and not provide this link to a process control engineer.

To generate role-dependent views, the software system may organize functions and data into layers, and map the layers to user roles, where each layer includes a collection of information from various sources (databases, devices reporting real-time signals, operator input, etc.). Mapping of layers to a user-dependent view may be specific to each software application operating as a respective component of the software system or the entire software system. In an example implementation, the software system retrieves the user's role from a database, identifies layers of information mapped to the user's role for the selected software application using a respective configuration file, and generates a role-dependent view. Because roles within an organization can be defined at any desired number of levels, the software system may overlay multiple layers of functions and data to generate a certain view. For example, the role a maintenance manager may correspond to multiple sub-roles depending on the area of technology for which the maintenance manager is responsible. In general, role definitions can include any number of tiers. A user may be allowed to further configure her view and in some cases override the mapping of layers to her role-dependent view.

Example embodiments of these techniques include a method and system to provide a role-based user interface are disclosed herein. An example system includes a display device to show a user interface and one or more processors. The one or more processors receive object information for an object in a process control system during a session, determine a user role based on the session, determine whether the object information is qualifying information based on the user role, and display the object information via the user interface when the object information is qualifying information.

Another example embodiment is a method that includes displaying a user interface, receiving object information associated with an object in a process control system during a session, and determining a user role based on the session. The method also includes determining whether the object information is qualifying information based on the user role, and displaying the object information via the user interface when the object information is qualifying information.

DETAILED DESCRIPTION

Figure 1:
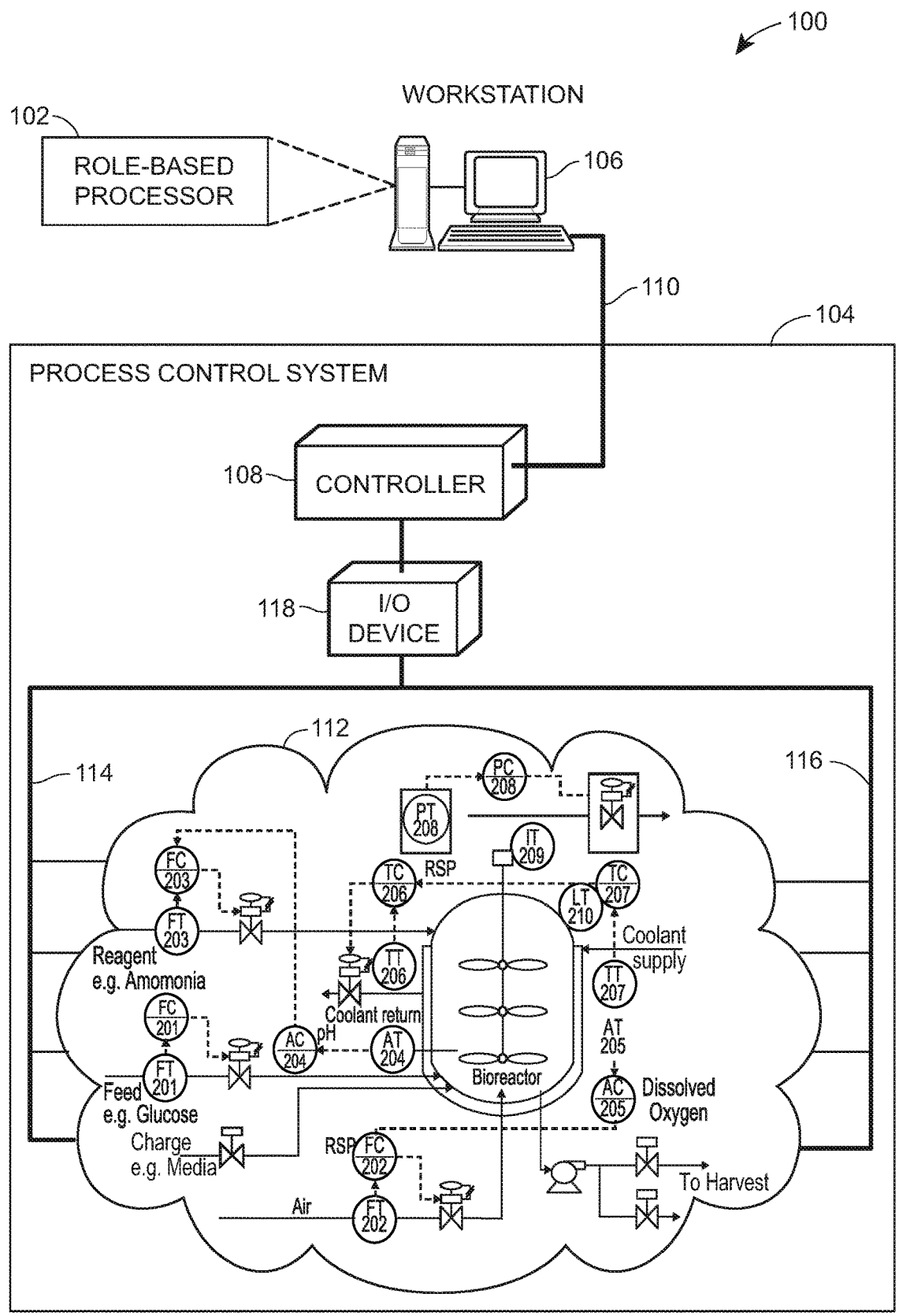
FIG. 1 is a schematic illustration of an example process control system and a workstation in which role-based user interface can be implemented as part of the software system for developing, monitoring, operating, and otherwise interacting with the process control system.

Although the following describes example methods and apparatus included, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus.

Example Types of Information Related to a Process Control System/Environment

In some known systems, information related to a process control system is presented in a number of disparate ways across applications and environments. For example, an application running in an engineering environment may present diagnostic information in the form of status indication overlays or custom visualizations for each type of node in the physical network. A node is an object or device that is in wired and/or wireless communication with another device. For example, field devices, switches, firewalls, etc. may all be considered nodes. A second, different application running in the engineering environment may show control integrity diagnostic information in the form of status icons on a module diagram. An engineering environment is a software environment that presents information via standard software interfaces. Additionally, each of these above-noted different applications may include different levels of information that may or may not be useful to a particular user. For example, a maintenance technician charged with maintaining an asset (e.g., a smart device such as a valve) in a plant may be interested in very detailed information (e.g., diagnostic parameters, maintenance history, etc.) about the asset. An operator may be primarily concerned with whether or not the asset (e.g., the valve) is open or closed, and how much product is passing through the valve. A control system engineer may indirectly monitor the valve to determine if the asset is negatively impacting the engineer's control strategies or logic depending on signals from the asset. For example, the control system engineer may select not to display information about the valve, but still be alerted to changes in the status of the valve.

Among other types of information, the software system of this disclosure can present information related to objects that can correspond to any aspects of the process that can be presented to a user. In addition, an object may include one or more facets that describe certain characteristics of that object. An object may have any number of facets that describe that object. For example, process control object facets may include identifying information of the object (e.g., object name, tag, nick name, etc.), physical information of the object (e.g., construction material of a tank, size of a smart device, etc.), logical information regarding the object (e.g., instructions or executable code, sometimes referred to as functional blocks or modules), graphical information regarding the object (e.g., a process display presented using icons rather than logic), Input/Output information regarding the object (e.g., signals received by an asset, etc.), user task information regarding the object (e.g., relevant actions that can be performed by a user on the object, etc.), etc. Using the facets of the object, the information displayed to a user via a user interface can be filtered to customize the user interface to display information that is relevant to a particular user (e.g., maintenance technician, operator, reliability engineer, supervisor, control system engineer, control room operator, etc.).

The software system also provide information related to tasks, which are sequences of work performed by users. A task sequence can be as simple as filling in a form, or performing some function such as changing a value in the process control system. Tasks can also be more complicated such as initiating or starting a unit, or tuning a process loop. In some examples, tasks may be created and/or modified by users to better match the plant needs.

In the examples disclosed herein, each facet can have three sets of default tasks. Configuration tasks enable a user to configure features of an object. For example, configuration tasks may include downloading software or information, exporting information, updating information, testing an object, commissioning an instrumentation asset (e.g., a controller), running a method on an instrumentation asset, etc. Runtime edit tasks enable a user to edit content in the object at runtime. For example, if an object is a chart, the runtime edit tasks may provide a way to change the traces shown in the chart. Example runtime edit tasks include filtering columns, resizing an interface, hiding or showing facets, changing context (e.g., specifying or selecting a different object), changing views, and/or adding a trend trace. Runtime write/execute tasks enable a user to change runtime values. For example, a graphical block that can be used to visualize interlocks provides an interface to disable an interlock. Example runtime write/execute tasks include changing operating modes, changing an object set point, changing alarm limits, taking out or disabling a service, bypassing an interlock, acknowledging alarms, tuning an object or process, forcing a value, analyzing alarms, and/or responding to a system prompt.

In addition, a user may create additional (or custom) tasks that are matched to certain personnel or user roles. Example user-defined tasks include asking for input from a user, opening displays, dashboards and/or faceplates, starting another task, etc.

However, not all tasks are of equal value to a user. For example, a software application performing diagnostics functions can provide diagnostics information ranging anywhere from the health of the software code (or logical components) executing in a controller (e.g., controller loading, control module integrity, etc.) to the physical health of digital control system hardware (e.g., network switches, workstations, etc.), process equipment (e.g., heat exchangers, etc.), or a single instrument such as a temperature transmitter. Personnel such as, for example, process control operators, system engineers, configuration engineers, maintenance personnel, technical support, etc. may utilize various aspects of the example integrated graphical user interface described herein to perform their duties. Thus, the information or tasks presented to a user via the examples described herein may take into account the different responsibilities of the user or personnel such as, for example, between operators, configuration engineers, maintenance personnel and/or technical support. Unlike previous systems, the software system disclosed herein utilizes role-based filtering to filter and organize (e.g., customize) a user interface to provide a user experience to the user optimized for the responsibilities or duties of the user. That is, the information or tasks displayed to a user may be filtered based on the organizational role or responsibilities of the user, context or state of the object in the system and/or organized via default desktop arrangements, specific visualizations in the user interface or display layouts.

Further, a process graphic may be developed using objects that include a graphical component and an interface to one or several physical devices to update the graphical component in real time. Some of the objects may be dedicated to control strategies (e.g., an PID loop object), while some of the objects may be dedicated to devices (e.g., a temperature sensor object). The user interface filter data received by the objects from the process plant to display information relevant to the user's organizational role. Alternatively, a process graphic can be developed using hardcoded references to devices. When generating the supplemental display, software system of this dislcosure may retrieve configuration data that specifies relationships between control strategies and devices from one or several configuration databases, and automatically generate the operator supplemental display, the maintenance supplement display, or another supplemental display specific to a user role using the retrieved information.

In addition to filtering information based on the organizational role or responsibilities of the user, the software system of this disclosure may filter information displayed to a user based on user preferences. Examples of filtering information displayed to a user include presenting a default set of software applications based on the organizational role or responsibilities of the user, showing or hiding specific information in a software application (e.g., filtering the contents of hierarchy tree), changing the displayed name, title or description of an object, showing different perspectives of the interfacing connections of the physical components of the process, filtering the tasks that are presented to the user, determining which facets of an object are displayed, filtering which applications are available to a user, and/or determining what types of alerts and alarms are displayed to the user. In some examples, the system may utilize multiple filters to customize the user interface of a user display. In some such examples, the system may apply the filters in layers, levels or tiers. For example, a first layer filter may filter facets based on the organizational roles and/or responsibilities of the user, a second layer filter may filter facets based on particular assets (e.g., a valve), a third layer filter may filter facets based on priority (e.g., does an alarm meet a threshold amount to display?), and a fourth layer filter may filter facets based on user preferences.

As discussed in more detail below, the software system of this disclosure also can facilitate information filtering by organizing functions and data from multiple sources into role-specific layers, such as the maintenance layer, the operator layer, the control system engineering layer, etc.

Example Process Control Environment

FIG. 1 is a block diagram showing an example process control environment 100 including an example role-based processor 102 and a process control system 104. The example role-based processor 102 may be implemented by and/or included within a workstation 106. In other example implementations, the role-based processor 102 may be included within a server, a distributed computing network, and/or any other computing device(s) that may be communicatively coupled to the workstation 106.

In an example implementation, the role-based processor 102 implements the software system that generates views based on user's organizational roles, as outlined above. For ease of illustration, example functionality of the software system outlined above is discussed below with reference to the role-based processor 102.

The example process control system 104 may include any type of manufacturing facility, process facility, automation facility, safety instrumented facility, and/or any other type of process control structure or system. In some examples, the process control system 104 may include multiple facilities located at different locations. Additionally, the example process control environment 100 may include other process control systems (not shown) that may be included within the same facility and/or located at a different facility.

The example process control environment 100 is provided to illustrate one type of system within which the example methods and software systems described in greater detail below may be advantageously employed. However, the example methods and software systems described herein may, if desired, be employed in other systems of greater or less complexity than the example process control environment 100 and/or the process control system 104 shown in FIG. 1 and/or systems that are used in connection with process control activities, enterprise management activities, communication activities, etc.

The example process control system 104 of FIG. 1 includes a controller 108 that may be communicatively coupled to the workstation 106. The process control system 104 also includes field devices 112 (e.g., input and/or output devices). The field devices 112 may include any type(s) of process control component(s) capable of receiving inputs, generating outputs, and/or controlling a process. The field devices 112 may include control devices such as, for example, valves, pumps, fans, heaters, coolers, and/or mixers to control a process. Additionally, the field devices 112 may include measurement or monitoring devices such as, for example, temperature sensors, pressure gauges, concentration gauges, fluid level meters, flow meters, and/or vapor sensors to measure portions of a process. The control devices may receive instructions from the controller 108 via inputs 114 to execute a specified command and cause a change to the process implemented and/or controlled by the field devices 112. Furthermore, the measurement devices measure process data, environmental data, and/or input device data and transmit the measured data via outputs 116 to the controller 108 as process data. This process data may include the values of variables corresponding to a measured output from each of the field devices 112.

In the illustrated example of FIG. 1, the example controller 108 may communicate with the field devices 112 within the process control system 104 via the inputs 114 and/or the outputs 116. The inputs 114 and the outputs 116 may be implemented by a data bus. This data bus may be coupled to intermediate communication components within the process control system 104. These communication components may include field junction boxes to communicatively couple the field devices 112 in a command area to the data bus. Additionally, the communication components may include marshaling cabinets to organize the communication paths to the field devices 112 and/or field junction boxes. Furthermore, the communication components may include I/O devices 118 (e.g., an I/O card) to receive data from the field devices 112 and convert the data into communications capable of being received by the example controller 108. Additionally, these I/O devices 118 may convert data or communications from the controller 108 into a data format capable of being processed by the corresponding field devices 112. In an example, the data bus may be implemented using the Fieldbus protocol or other types of wired (e.g., Profibus, DeviceNet, Foundation Fieldbus) and/or wireless communication protocols (e.g., Wireless HART protocol, etc.).

The example controller 108 of FIG. 1 manages one or more control routines (e.g., process control algorithms, functions, and/or instructions) to control the field devices 112 within the process control system 104. The control routines may include process monitoring applications, alarm management applications, process trending and/or history applications, diagnostic applications, batch processing and/or campaign management applications, statistical applications, streaming video applications, advanced control applications, safety instrumented applications, etc. The control routine(s) may ensure that the process control system 104 produces specified quantities of a desired product within a certain quality threshold. For example, the process control system 104 may be configured as a batch system that produces a product at a conclusion and/or during a batch process. In other examples, the process control system 104 may include a continuous process manufacturing system that constantly produces products. Furthermore, the controller 108 may forward process data utilized within the control routine(s) to the example role-based processor 102.

In the example process control environment 100 of FIG. 1, the workstation 106 may be communicatively coupled to the controller 108 via a local area network (LAN) 110. The example workstation 106 may include any computing device including a personal computer, a laptop, a server, a controller, a smartphone, a personal digital assistant (PDA), a microcomputer, etc. Additionally, the workstation 106 may be implemented using any suitable computer system or processing system (e.g., a processor platform 900 shown in FIG. 9). For example, the workstation 106 could be implemented using a single processor personal computer, single or multi-processor workstations, etc.

The example of FIG. 1 shows the example workstation 106 exterior to the process control system 104. In other examples, the workstation 106 may be included within the process control system 104 and/or communicatively coupled directly to the controller 108. Additionally, the process control environment 100 may include routers (not shown) to communicatively couple other workstations (not shown) to the controller 108, and/or to communicatively couple the workstation 106 to other controllers (not shown) within other process control systems. Further, the process control environment 100 may include a firewall (not shown) to provide remote workstations (e.g., workstations outside of the process control environment 100) access to resources within the process control environment 100.

The example LAN 110 may be implemented using any desired communication medium and protocol. For example, the LAN 110 may be based on a hardwired or wireless Ethernet communication scheme. However, any other suitable communication medium and protocol could be used. Furthermore, although a single LAN 110 is shown, more than one LAN and appropriate communication hardware within the workstation 106 may be used to provide redundant communication paths between the workstation 106 and a respective similar workstation (not shown).

The example workstation 106 and/or other workstations with access to the process control system 104 may be configured to view, modify, and/or correct one or more processes within the process control system 104. The example workstation 106 enables a user to review and/or operate one or more user display screens and/or applications that enable the user to view role-based process control system variables, view role-based process control system states, view role-based process control system conditions, view role-based process control system alarms, and/or change process control system settings (e.g., set points, operating states, clear alarms, silence alarms, etc.). An example manner of implementing the example workstation 106 is described below in connection with FIG. 2. Example user display applications that may be used to implement the example workstation 106 are described below in connection with FIGS. 3-7.

The example workstation 106 includes and/or implements the role-based processor 102 to monitor the process control routine and/or process control information transmitted by the controller 108 to identify and/or determine status issues. The process control information may originate from a process control device that may include, for example, the field devices 112, the controller 108, a component within the process control system 104, etc. Alternatively, the process control information and/or status information may be generated by applications. The applications may utilize process control information from the field devices 112 and/or the controller 108 to calculate and/or determine status information and/or other process control information. For example, the DeltaV software suite sold by Emerson Process Management, includes applications that may collect tuning, status conditions, diagnostics and/or performance parameters or metrics generated by the field devices 112. Using the collected parameters, the application may display system-wide status information or more granular, specific role-based visualizations via a user interface.

Example Functionality of a Role-Based Processor

In some examples, the role-based processor 102 dynamically customizes information presented to a user via a role-based presentation interface (e.g., example role-based presentation interfaces of FIGS. 3-7) to display information to the user based on criteria assigned to a user role, thereby enabling the role-based presentation interface to display qualifying information to the user while filtering out (e.g., not displaying) information not qualifying under the criteria assigned to the user role. In some examples, a certain criterion may be expressed using a threshold value. In some examples, the role-based processor 102 may progressively disclose information to the user. That is, the role-based processor 102 may initially not display information to the user, but allow the user to subsequently access a portion of the information. For example, the user may elect to view alarm information that did not initially meet a priority threshold and was, therefore, initially filtered out by the role-based processor 102. In some such examples, the user may expand a collapsed section of (alarm) information in the user interface to receive additional information regarding the alarms. In some examples, the role-based processor 102 may display qualifying information in sections (or tabs) with one or more sections in an expanded state by default and one or more sections in a collapsed state by default. For example, depending on the organizational roles and/or responsibilities of the user, the role-based processor 102 may limit which collapsed sections the user may expand or view in the first place. In some such examples, the role-based processor 102 may make a second determination as to whether the additional (e.g., collapsed) information qualifies under criteria assigned to the user role before presenting the additional information. In this manner, the role-based processor 102 progressively discloses information to the user by, for example, filtering an initial portion (or default) information for a given task or as the user requests the information, thereby enabling the user to decide what qualifying information is of importance to accomplish the given task.

In some examples, the role-based processor 102 determines whether information is qualifying information based on a comparison of the user role to a list of qualifying information stored in a data structure such as, for example, a lookup table. In some such examples, if the information matches qualifying information listed in the lookup table, the information is determined to be qualifying information. For example, the role-based processor 102 may display physical facets and graphical facets of an object (e.g., node or entity) in the process control system to a maintenance technician, while filtering out logical facets of the object based on the list of qualifying information stored in the lookup table.

In some examples, the role-based processor 102 may apply a user-controlled filter. In some such examples, the user-controlled filter may override qualifying information or preferred type of visualization. For example, a user may prefer information to be displayed as a table rather than as a pie chart or to view objects or facets that are typically not associated with the user role. In some such examples, qualifying information based on, for example, the organizational role or responsibilities of the user may be further filtered by the personal preferences of the user (e.g., a user-controlled filter).

The role-based processor 102 also can facilitate information filtering by organizing functions and data from one or more sources into role-specific layers, such as the maintenance layer, the operator layer, the control system engineering layer, etc. Each layer can correspond to a collection of data from one or several sources. For example, the role-based processor 102 can generate an instance of the maintenance layer that includes diagnostic parameters reported by field devices, maintenance history retrieved from a maintenance database, observations regarding field devices submitted by technicians, etc. The role-based processor 102 can display information for the maintenance layer when the user's organizational role is maintenance manager, for example, but not display the information for the maintenance layer when the role is control system engineer. In some implementations, the role-based processor 102 allows users to activate and deactivate a role-specific layer via a small set of commands, possibly a single command. Moreover, in some implementations, a role-specific layer also can specify the layout of the information related to the layer.

Further, the role-based processor 102 can facilitate navigation between informational screens based on the organizational role of the user. For example, when the role-based 102 displays equipment status information to both an instrument engineer and a configuration engineer, the role-based processor 102 can provide a control for directly navigating to equipment tracking screens to the instrument engineer but not the configuration engineer. The control can be, for example, a button on the toolbar, an option in a pull-down menu, an icon displayed next to the depiction of a unit of equipment, or any other suitable interactive indicator of a direct link. In this manner, the role-based processor 102 can help the user "walk the path" of relationships between functions and/or entities to better understand how information in the process control environment 100 is logically linked.

Still further, the role-based processor 102 can arrange links to information of various types into a hierarchical menu and "pivot," or emphasize a subset of the links in the menu, according to the organizational role of the user to generate a particular perspective. An example menu can include list selectable assets, I/O points, logic entities, visualizations, etc. Depending on the user's organizational role, the role-based processor 102 can generate an asset-centric or a logic-centric view of the menu, for example.

More generally, the role-processor 102 can provide role-dependent views to all personnel involved in configuring, operating, supervising, etc. a process control environment. One such role may be that of an operator responsible for supervising process parameters such as flow, level, temperature, pressure, etc., monitoring events related to process control loops, and generally assuring accuracy of control logic implemented in the process plant. Another role may that of a maintenance technician responsible for monitoring and calibrating individual field devices, and generally supervising equipment used in the process control plant. Yet another role may be that of a network administrator responsible for network connectivity between workstations, controllers, data servers, databases, and other network devices, security of the plant network, installation of software updates, etc. As a more specific example, operator interface of the role-based processor 102 allows operators to supervise operation of a process plant, in which multiple field devices execute process control functions defining a control strategy. The role-based processor 102 may generate views with information specific to operators' roles rather than providing a generic operator view at an operator workstation. To this end, the role-based processor 102 may ask that an operator log in or otherwise identify his role. In addition to providing role-specific layers controls and information to an operator, the role-based processor 102 may support persistent (i.e., surviving across log-in sessions) user-specific configuration.

A role-dependent operator view may generate a graphical representation of a process plant (the "process graphic") and display additional information for a selected portion of the process plant according to the operator's role. The process graphic can include, for example, graphic or schematic depictions of field devices (e.g., valves, pumps, sensors, transmitters) that participate in the corresponding process control function, equipment on which these field devices operate (e.g., tanks, mixers), connections for conducting process fluids between the field devices and the equipment (e.g., pipes), and electrical connections between the field devices (e.g., wires, wireless links). The role-based processor 102 may display the additional information via a supplemental display implemented, for example, as one or several separate windows, a graphic layer superimposed on the process graphic, or text and/or graphics on a banner disposed below, above, or next to the process graphic.

In some scenarios, the operator selects a location on the process graphic and activates a control on the user interface such as a button, for example, to request the supplemental display from the user interface. In other scenarios, the role-based processor 102 automatically activates the supplemental display in response to detecting an abnormal condition, according to a pre-configured schedule, or based on another event. The role-based processor 102 may interpret the location which the user selects according to the user's organizational role. Thus, by clicking on a location at or near a graphic illustrating a flow rate sensor, a maintenance technician can select the physical device (i.e., the flow rate sensor), whereas an operator can select a control loop in which the flow rate sensor operates.

For an operator, the supplemental display (or "the operator supplemental display") may include a configuration display that depicts control logic implemented by a certain portion of the process plant as several interconnected logic blocks, for example. In some cases, the logic blocks are Foundation™ Fieldbus function blocks. The operator supplemental display may also include a parameter history display to illustrate the history of a certain process parameter (e.g., flow rate at an input to a certain processing stage). Further, the operator supplemental display may include a knowledge display that lists links to internal and external documentation available for the portion of the process plant, provides access to operator logbooks, suggests help topics, etc. Still further, the operator supplemental display may include a device dependencies display that lists identifies of the field devices used in the portion of the process plant to which the process graphic corresponds. The device dependencies display may retrieve device-specific graphics from a configuration database to display next to each identifier of a field device. If desired, the operator supplemental display may additionally include a detail display that provides detailed information related to devices used in the portion of the process plant to which the process graphic corresponds, interlocks associated with these devices and the corresponding interlock conditions, alarms generated for the portion of the process plant, tuning parameters, etc.

As yet another example, when the user is a maintenance technician or is otherwise associated with maintenance personnel, the supplemental display (or "the maintenance supplemental display") may include a control dependencies display for a selected device that identifies a portion of the control strategy (e.g., a control loop) in which the device operates. The maintenance supplemental display may also include a knowledge display generally similar to the knowledge display generated for the operator. In particular, the knowledge display may list links to internal and external documentation available for the device, as well as links to operator logbooks, help topics, etc. Further, the maintenance supplemental display may include a diagnostic display to assist the maintenance technician with locating the physical device in the process plant, identifying the source of an alarm, and determining the relationship between the device and other equipment. The diagnostic display may, for example, depict a Fieldbus segment along with the several devices coupled to the Fieldbus segment, and identify the device from which an alarm has been received by highlighting the corresponding graphic, displaying an exclamation mark or other visual indicator next to the device, or in any other suitable manner. Still further, the maintenance supplemental display may include a device description display that includes, in some implementations, the device identification consistent the Extended Device Description Language (EDDL), device configuration and setup data, and device diagnostics data. In some cases, the device description display includes a so-called device faceplate implemented as a photograph or a drawing identical or similar to the actual physical appearance of the device and, if desired, several dials or meters to depict process data specific to the device (e.g., pressure setpoints, pressure measurement, percentage of valve movement). When the device is an intelligent valve executing corresponding valve software (e.g., AMS Valve-Link application offered by Emerson Process ManagementTM as part of the PlantWeb® suite), the maintenance supplemental display may additionally include a valve software display updated with data output by the valve software.

The role-based processor 102 may functions for generating a primary display as well as functions for generating a supplemental display. The primary display can include a process graphic defined by a configuration engineer, for example, and the role-based processor 102 can automatically select and display, via the supplemental display, additional information in response to detecting an event in the process plant or receiving a command from the user interface. To generate the primary and/or the secondary display, the role-based processor 102 can obtain (i) real-time process data from the process control system 104, (ii) control strategy information such as control logic, device configuration data, process and device graphics, links between control strategies and devices, etc. from a configuration database (not shown to simply illustration), (iii) application data from one or several specialized applications, (iv) historical data related to process or device parameters from a historian, implemented in one or several databases (now shown), (v) reference information from a knowledge database (not shown), etc.

In some cases, the role-based processor 102 uses display structures that define several layers such as an operator layer, a maintenance layer, a network layer, etc. The role-based processor 102 may update information related to each layer using real-time process data irrespective of the organizational role of the user, but activate the display of only the selected one or several layers according to the currently relevant/selected view (e.g., operator, maintenance).

The supplemental display may be user-configurable, so that an individual user can specify that information should be included in the corresponding supplemental display. In some embodiments, the role-based processor 102 automatically switches an operator supplemental display to a maintenance supplemental display, or vice versa, in response to a command received from the user interface. While the examples disclosed herein relate to filtering the process control information based on user roles and objects, others methods of filtering are also possible. For example, the role-based processor 102 may filter information based on a comparison of permission or security clearance level, tags or metadata associated with the process control facet information or the context of the object within the control system.

Example Implementation of a Workstation that Provides Role-Based Views

Figure 2:
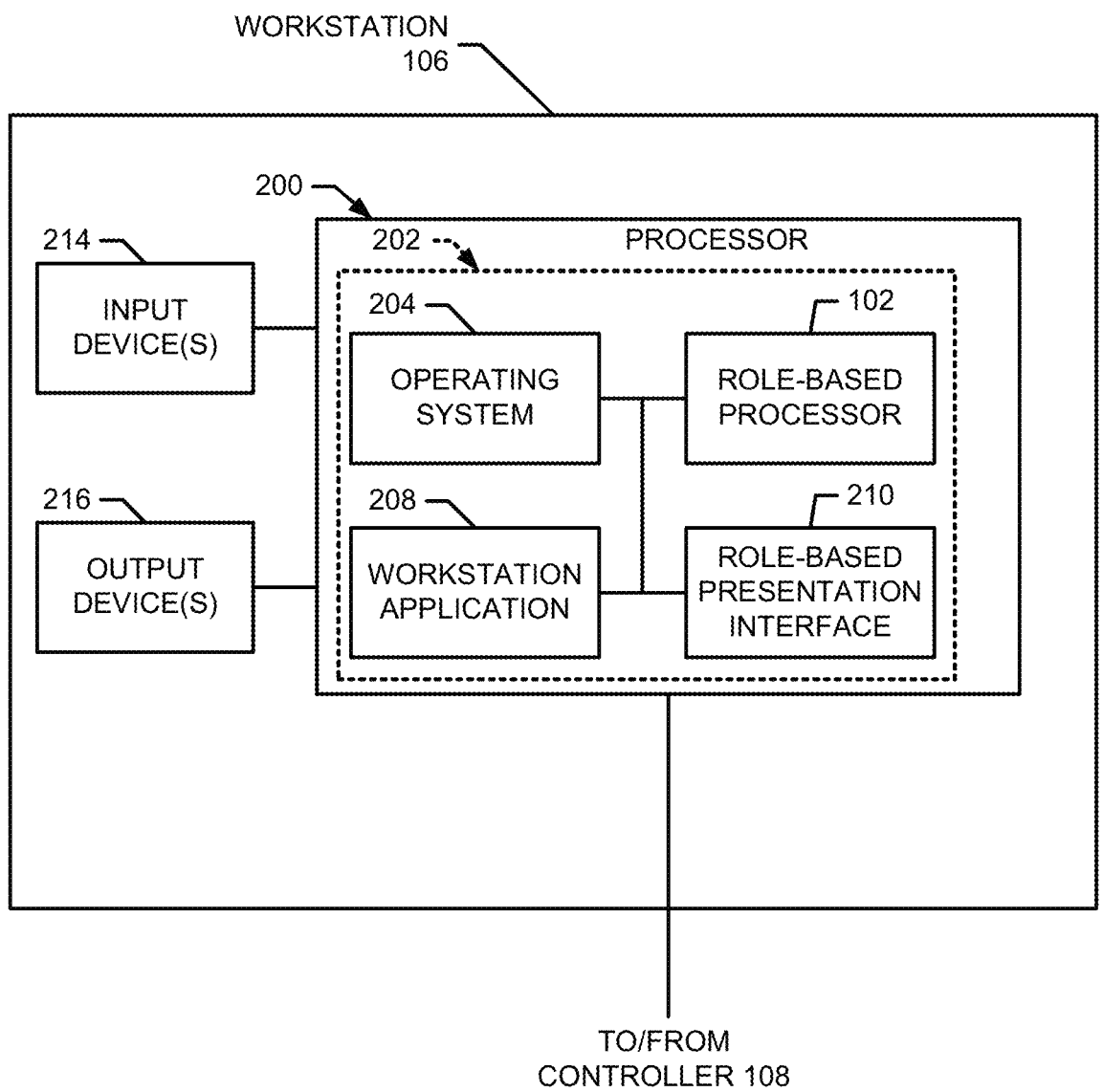
FIG. 2 illustrates an example manner of implementing the workstation of FIG. 1.

FIG. 2 illustrates an example manner of implementing the workstation 106 of FIG. 1. The workstation 106 of FIG. 2 includes at least one programmable processor 200. The example processor 200 of FIG. 2 executes coded instructions present in a main memory 202 of the processor 200 (e.g., within a random-access memory (RAM) and/or a read-only memory (ROM)). The processor 200 may be any type of processing unit, such as a processor core, a processor and/or a microcontroller. The processor 200 may execute, among other things, an operating system 204, the role-based processor 102, a workstation application 208, and a role-based presentation interface 210. An example operating system 204 is an operating system from Microsoft®. The example main memory 202 of FIG. 2 may be implemented by and/or within the processor 200 and/or may be one or more memories and/or memory devices operatively coupled to the processor 200. Although examples disclosed herein are described in connection with a processor, disclosed techniques may also be used in connection a rules engine, a distributed processing system, etc.

To allow a user to interact with the example processor 200, the example workstation 106 of FIG. 2 includes input device(s) 214 and output device(s) 216. User input may be communicated to the processor 200 by one or more input device(s) 214 such as a keyboard, a stylus pen, a voice recognition system, a mouse, and/or a touch screen, etc. Output from the processor 200 may be communicated to the user by one or more output device(s) 216 such as, for example, a display device capable of depicting user interfaces and/or applications implemented by the processor 200 and/or, more generally, the example workstation 106. Example output devices 216 include, but are not limited to, a computer monitor, a computer screen, a television, a mobile device (e.g., a smartphone, a Blackberry™, iPad™ and/or an iPhone™), etc.

The example operating system 204 of FIG. 2 displays and/or facilitates the display of the role-based presentation interface 210 by and/or at the example output device 216. To facilitate personnel interactions with applications implemented by the example workstation 106, the example operating system 204 implements an application programming interface (API) by which the example role-based processor 102 can define and/or select the role-based presentation interface 210 via the workstation application 208, and cause and/or instruct the operating system 204 to display the defined and/or selected role-based presentation interface 210. An example role-based presentation interface 210 is described below in connection with FIGS. 3-7.

Figure 5:
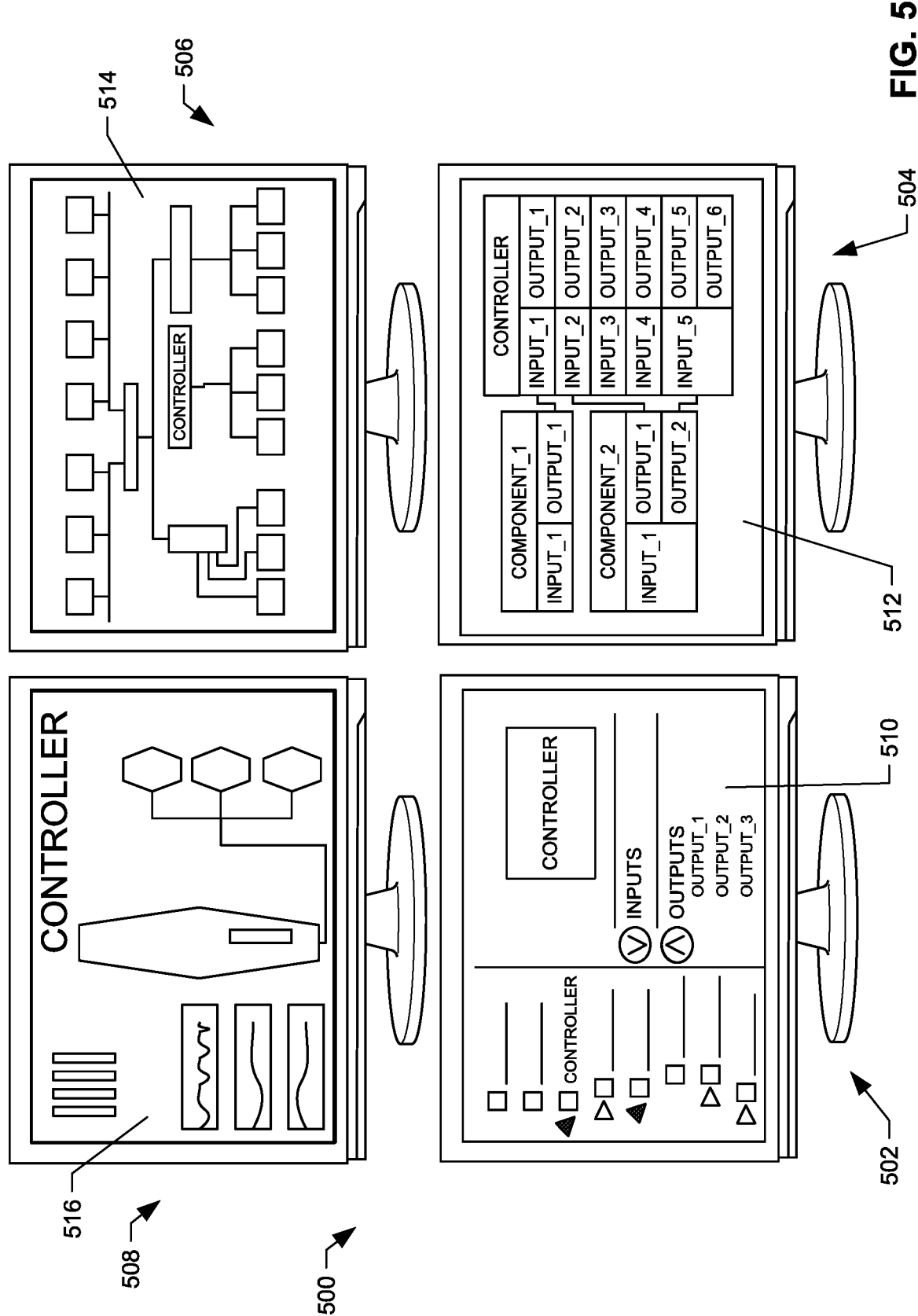

To present process control system displays and/or applications, the example workstation 106 of FIG. 2 includes the example role-based processor 102. The example role-based processor 102 of FIG. 2 filters facets (e.g., tasks, information, etc.) based on certain criteria to dynamically create and/or define a role-based presentation interface 210 via the workstation application 208. For example, depending on the personnel (e.g., the organizational role or responsibilities of a user) accessing the workstation 106, certain tasks or information may be made displayed via the role-based presentation interface 210 while other facets of information are hidden (e.g., not displayed). In some other examples, the role-based processor 102 organizes what is displayed to the user via default desktop arrangements and display layouts (FIG. 5). For example, depending on the number of monitors coupled to the workstation 106 and the personnel accessing the workstation 106, the role-based processor 102 may automatically display different information on one or more of the monitors by default. In some such examples, the user may modify or override the role-based default via a user preference for the desktop arrangements and display layouts.

In some examples, facets of information filtered by the role-based processor 102 includes tasks and one or more sub-tasks to be performed by the user. For example, a task may include diagnosing the cause of a non-updating display element (e.g., a main task). Performing the main task may include determining which components are associated with the display element (e.g., a first sub-task), verifying the integrity of the input/output connections for that component (e.g., a second sub-task), etc.

In the illustrated example, the information is filtered based on criteria associated with user roles. Roles may be defined by one or more tasks or responsibilities typically performed by the personnel. An example role is a control room operator. Responsibilities and/or tasks associated with such an operator may include detecting issues (e.g., status issues) that could affect safety, the environment or equipment at and around near the plant, ensuring plant equipment performance and safety, performing planned startup/shutdown of production equipment, monitoring and controlling processes to ensure optimal performance, and/or watching key trends to identify potential process issues and taking corrective actions. Another example role is a control systems engineer having associated responsibilities and/or tasks including supporting production from a control system perspective (e.g., making sure the process is performing correctly) and/or controlling system configurations, designing, implementing and testing configurations, troubleshooting production problems to determine if the problems are control system related, determining alarm notifications (e.g., conditional alarms, limits, etc.) and/or maintaining control strategies. Responsibilities, goals, and/or tasks may be pre-assigned to a role, and modified (e.g., added, removed, adjusted, etc.) at a later time by, for example, by a user manager via, for example, a user manager software application.

For example, the role-based processor 102 may identify a number of roles, where each role includes a pre-assigned set of responsibilities, goals and/or tasks. For instance, the example role-based processor 102 may have different responsibilities, goals and/or tasks pre-assigned for a batch operator, a lead control room operator, a production manager, a reliability manager, a control system engineer, a process engineer, an instrument engineer, an instrument technician, a reliability maintenance technician, a technical support engineer, a unit maintenance technician, a control system administrator, a control room operator, etc. While a plant may have personnel performing the responsibilities, goals and/or tasks associated with each of the roles, the plant may not have the number of personnel to allow each person to have a different role. That is, in some plants, one person may perform the responsibilities, goals and/or tasks of multiple pre-assigned roles. Additionally, the same role may have different responsibilities, goals and/or tasks at different plants. Thus, a user manager software application may be used to customize the responsibilities, goals and/or tasks assigned to each role or specific to each person. For example, while a person at a plant may have the job title of Production Manager, the person may perform the tasks of a production manager, a process engineer and an instrument engineer. In some such examples, the user manager may customize the responsibilities, goals and/or tasks assigned to the person to include the tasks pre-assigned for a production manager, a process engineer and an instrument engineer. As a result, the person does not have to change roles in the system because of the different information the person desires to have displayed. Rather, the information available to a production manager, a process engineer and an instrument engineer are all available to the user at the same time without additional user initiated filtering (e.g., mouse clicks).

In some examples, the role-based processor 102 implements security via permissions on tasks. Users are granted permissions, and tasks have associated permission levels. Permission levels may be specified for tasks, modules, module parameters, parameter fields, instrumentation assets, digital control system hardware, and/or plant equipment. In some examples, the permission level for a main task does not override the permission level for any sub-task(s).

In some examples, personnel may be assigned a span of control. The span is all the tasks that a user can perform. The span of control may be geographically assigned or location-based (e.g., site-wide, an area of the plant, a cell of the plant, or a unit of the process). In some examples, the span of control may be object-based (e.g., limited to certain objects or facets of information regarding the object). For example, the span of control for a user may limit the user to calibrating controller instrumentation assets. In some other examples, the span of control may be a combination of location-based or geographically-based and object-based (e.g., a user is allowed to calibrate controller instrumentation assets located in a Reactors area portion of the plant). In some examples, the span of control may be application-based (e.g., a user is allowed to configure aspects of software applications performing security functions). In some other examples, the span of control may be applied to a workstation. For example, certain workstations included in a process control environment (e.g., the process control environment 100 of FIG. 1) may have functionality limited to certain operational modes. In some examples, the span of control may be the intersection of the span of control of a user and a workstation. For example, a user with site-wide span of control may be limited to operations relating to the Reactors area because of the workstation the user is accessing. In some examples, the span of control may be context-based. For example, the span of control may limit the object information displayed to the user by checking whether the object information is privileged or proprietary information.

While an example manner of implementing the example workstation 106 of FIG. 1 has been illustrated in FIG. 2, the data structures, elements, processes and devices illustrated in FIG. 2 may be combined, divided, re-arranged, omitted, eliminated and/or implemented in any other way. Further, the example processor 200, the example main memory 202, the example operating system 204, the example role-based processor 102, the example workstation application 208, the example role-based presentation interface 210, and/or, more generally, the example workstation 106 of FIG. 2 may be implemented by hardware, software, firmware and/or any combination of hardware, software and/or firmware. Further still, the example workstation 106 may include additional elements, processes and/or devices instead of, or in addition to, those illustrated in FIG. 2, and/or may include more than one of any or all of the illustrated data structures, elements, processes and devices.

Examples of presentation interfaces

Figure 3:
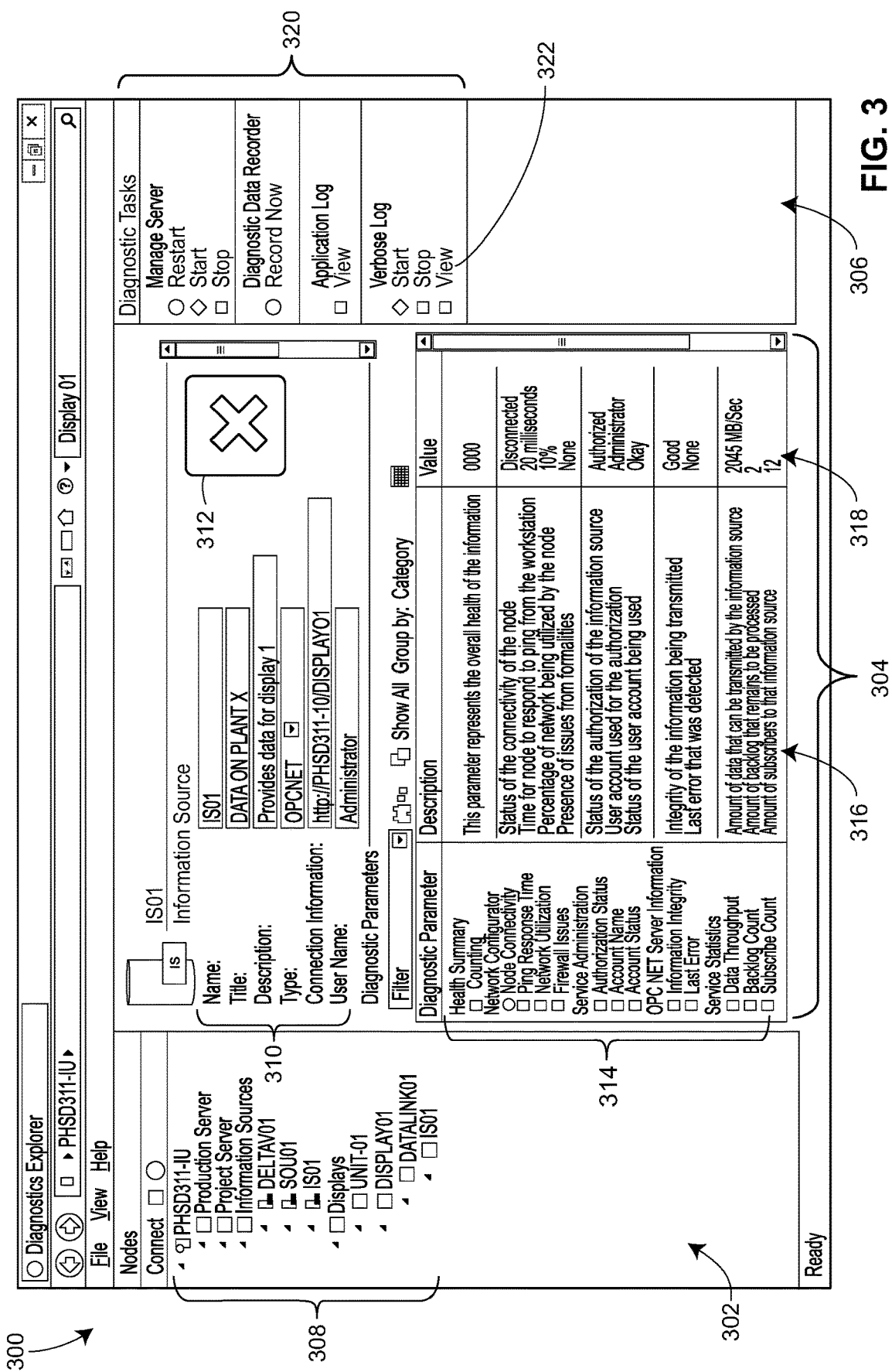
FIG. 3 illustrates an example role-based presentation interface that may be implemented in the workstation of FIG. 1.

FIG. 3 illustrates an example role-based presentation interface 300 that may be used to implement a display and/or application and/or, more generally, the example workstation 106 of FIGS. 1 and 2. The example role-based presentation interface 300 may be displayed as an independent interface or in combination with one or more other elements or interfaces (not shown) of a role-based interface. In the illustrated example of FIG. 3, the role-based presentation interface 300 displays a role-based interface for a control systems engineer running a software application performing diagnostic functions. The role-based presentation interface 300 includes a navigation frame 302, a content frame 304 and a tasks frame 306. The navigation frame 302 includes an example hierarchy tree 308 for navigating between nodes connected to the physical network. The content frame 304 includes example node descriptors 310 to display additional information regarding a selected node via, for example, the hierarchy tree 308. The current state of the selected node may be represented graphically by, for example, an icon such as an example status icon 312, located at the rightmost end of the content frame 304. The content frame 304 also includes an example diagnostic parameters list 314 that contains a list of diagnostic parameters for a selected node with a description column 316 and a value column 318 including relevant information corresponding to each diagnostic parameter listed in the diagnostic parameters list 314. The tasks frame 306 includes a diagnostic tasks list 320 that contains a list of diagnostic tasks available for the user to access for the selected node with sub-tasks 322 providing additional selections and/or information for the user.

In some examples, the diagnostic tasks displayed in the tasks list 320 varies based on the personnel (e.g., the organizational role and/or responsibilities of a user). For example, as the Verbose Log and the Application Log tasks listed in the tasks list 320 pertain to debugging software applications (e.g., the example software application performing diagnostic functions), the role-based processor 102 may filter out the Verbose Log and/or the Application Log tasks when creating the role-based presentation interface 300 for a control systems engineer.

Figure 4:
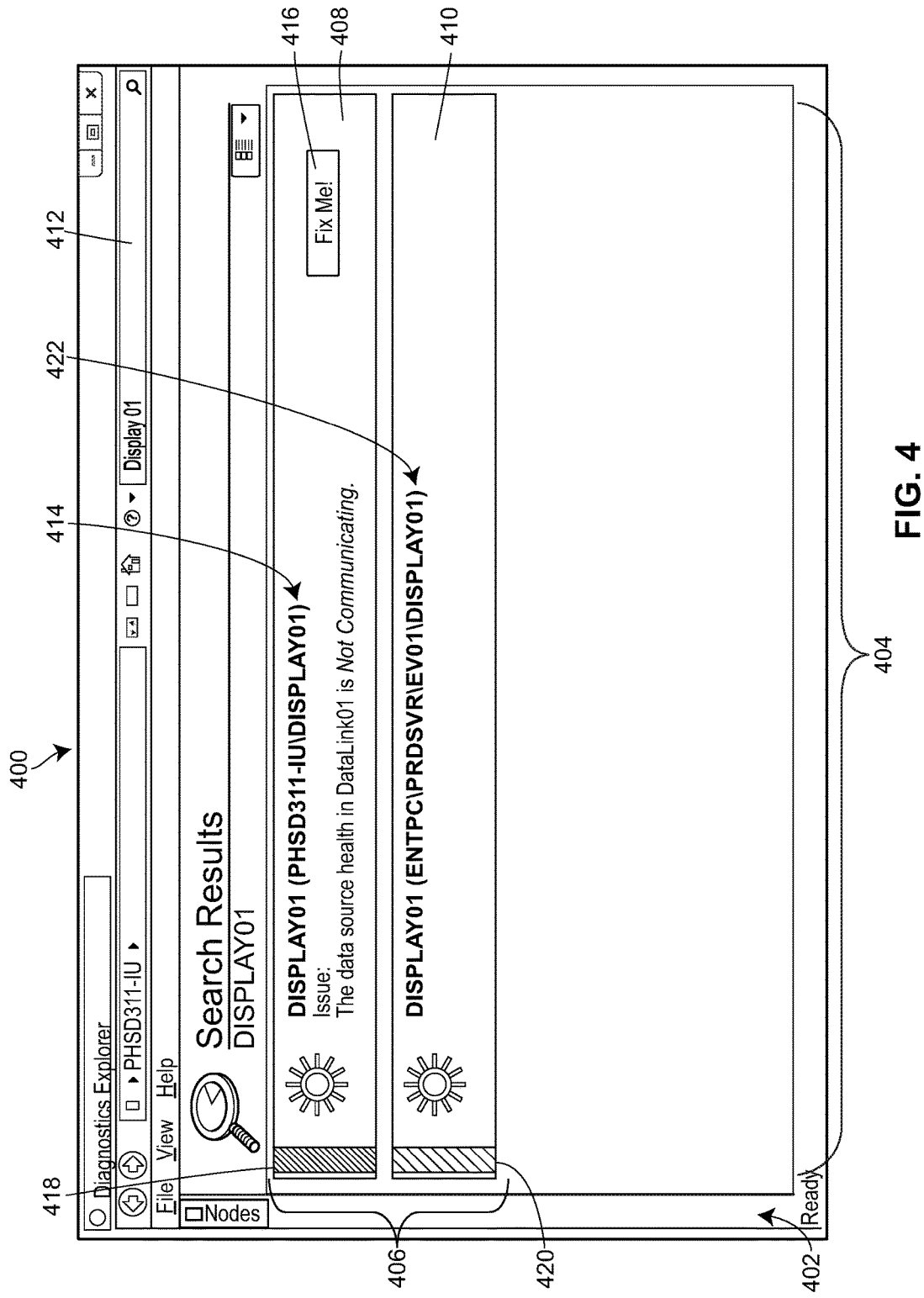
FIGS. 4-7 illustrate other examples of the role-based presentation interface.

FIG. 4 illustrates another example role-based presentation interface 400. The role-based presentation interface 400 includes a collapsed example navigation frame 402 and an example content frame 404. In the illustrated example, the user performed a search using, for example, an example search bar 412 and the search results are included in an example results list 406 including example result entries 408 and 410. As shown in FIG. 4, the results entry 408 includes an example status indicator 418, an example node descriptor 414 and an example task button 416. In contrast, the result entry 410 includes an example status indicator 420 and a node descriptor 422. In the illustrated example, the color of the status indicator 418, 420 is representative of the status of the node in the result entry. For example, a red status indicator may indicate that the corresponding node has an issue, while a green status indicator may indicate that the corresponding node is functioning properly. However, other methods of representing the status of a node are also possible. The node descriptors 414, 422 provide information regarding the node, such as the name of the node, the location of the node and/or an issue description. In addition, the task button 416 enables the user to receive additional information regarding the corresponding node. For example, the task button 416 may enable the user to troubleshoot the issue.

In some examples, the information displayed on the role-based presentation interface 400 depends on the personnel (e.g., the organizational role and/or responsibilities of a user). For example, the role-based processor 102 of FIGS. 1 and 2 may filter out task buttons (e.g., selectable interface objects) for certain personnel. In some examples, selecting a task button (e.g., the example task button 416) may progressively disclose additional information. For example, rather than including the task button 416, instructions to fix the issue may be displayed in the result entry 408 for certain personnel. Thus, by selecting the task button 416, the user may receive information to fix an issue that was previously filtered out from the role-based presentation interface 400. In other examples, the result entries included in the results list 406 may include nodes with issues (e.g., the results entry 408) while filtering out nodes with no known issues (e.g., the results entry 410). However, other combinations of displaying and filtering out information on the role-based presentation interface 400 are also possible.

In some examples, the desktop arrangement and/or display layout may be determined by the role-based processor 102 based on the organizational role and/or the responsibilities of the user. For example, identifying that the workstation 106 includes a four monitor configuration, the role-based processor 102 may automatically create and/or define a different role-based presentation interface 210 for each of the monitors based on four common software applications utilized by the user role.

FIG. 5 is another example role-based presentation interface 500. The role-based presentation interface 500 is a desktop arrangement for a four monitor display where multiple applications are working together across multiple monitors on the same workstation. In the illustrated example, each of the example monitors 502, 504, 506, 508 is displaying a graphical user interface corresponding to a different software application. For example, the monitor 502 is displaying an example role-based presentation interface 510 for a software application performing diagnostic functions and displaying system-wide diagnostics for the process. The monitor 504 is displaying an example role-based presentation interface 512 for a software application performing control logic functions and displaying a selected function block including the inputs and outputs. The monitor 506 is displaying an example role-based presentation interface 514 for a software application performing interface connecting for the physical components of the process and displaying an as-connected map of the physical components of the process. The monitor 508 is displaying an example role-based presentation interface 516 for a software application performing node management functions and is displaying detailed information for a selected node.

In some examples, the role-based presentation interface 500 includes a different combination and/or arrangement of monitors. For example, a two, three, or more monitor display may be arranged. In some examples, the role-based presentation interfaces 510, 512, 514, 516 for each of the monitors 502, 504, 506, 508 update or refresh based on changes or selections to information displayed in a different role-based presentation interface. For example, a user may select a valve control module on the role-based presentation interface 510, and the role-based presentation interface 512 may display a function block that contains the input/output point references for the valve control module, the role-based presentation interface 514 may display the primary control display for the valve control module with the valve highlighted, and the role-based presentation interface 516 may display detailed information for the valve. In some examples, whether one or more role-based presentation interfaces refresh or update based on changes or selections in a different role-based presentation interface may be configured for a user role and/or by the user.

Figure 6:
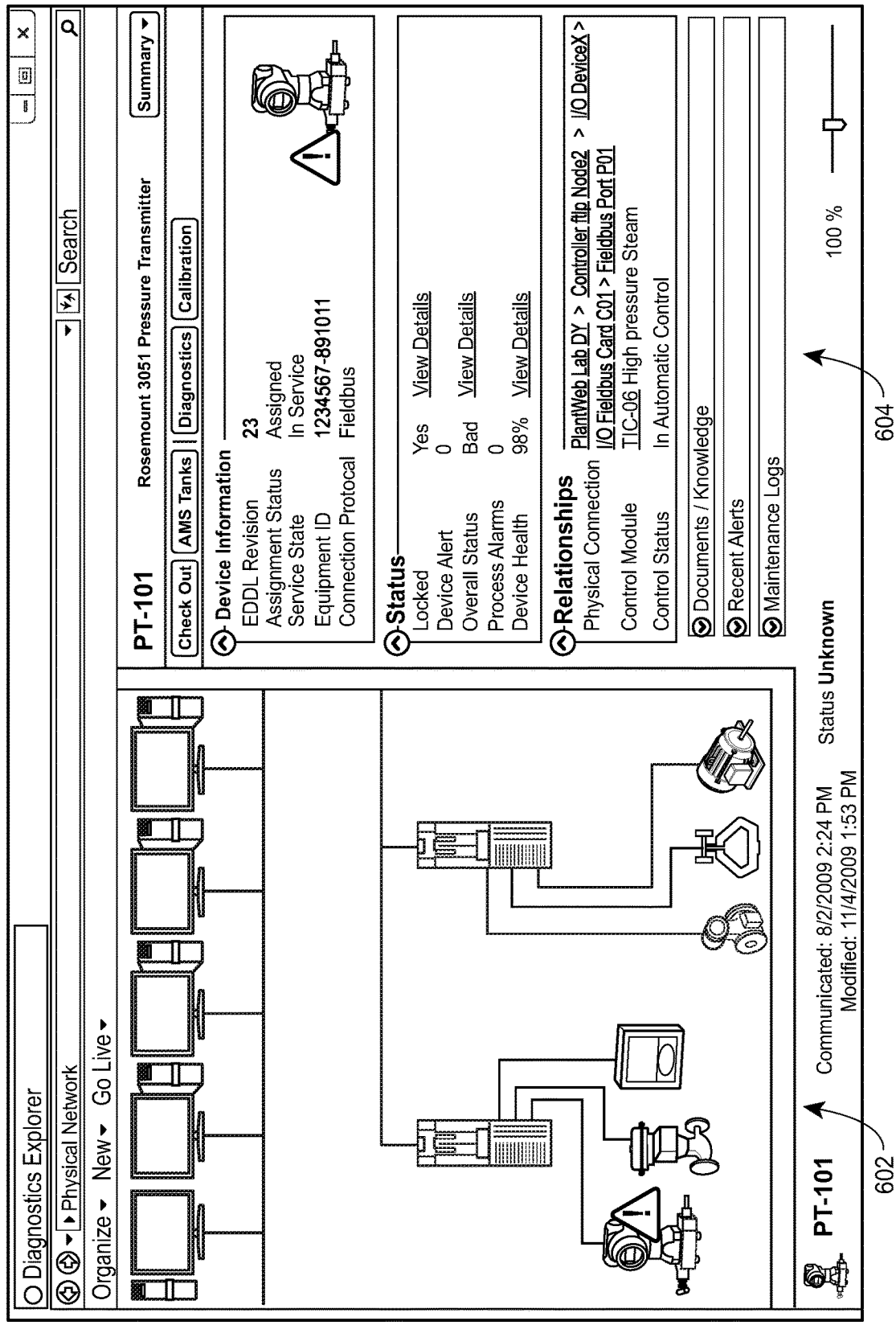

FIG. 6 is another example role-based presentation interface 600. The role-based presentation interface 600 includes an example navigation frame 602 and an example content frame 604. In the illustrated example, the navigation frame 602 is displaying a portion of an as-connected map of the process control system 104. An as-connected map is a topological map depicting the interfacing connections between the input/output subsystems of the physical components. In contrast, an as-configured map is a topological map depicting the connections between the physical components of the process as they were designed to be configured. For example, an as-configured map displays connections based on how a user intended the physical components to be connected. However, the as-connected map displays the interfacing connections as they are actually connected.

Figure 7:
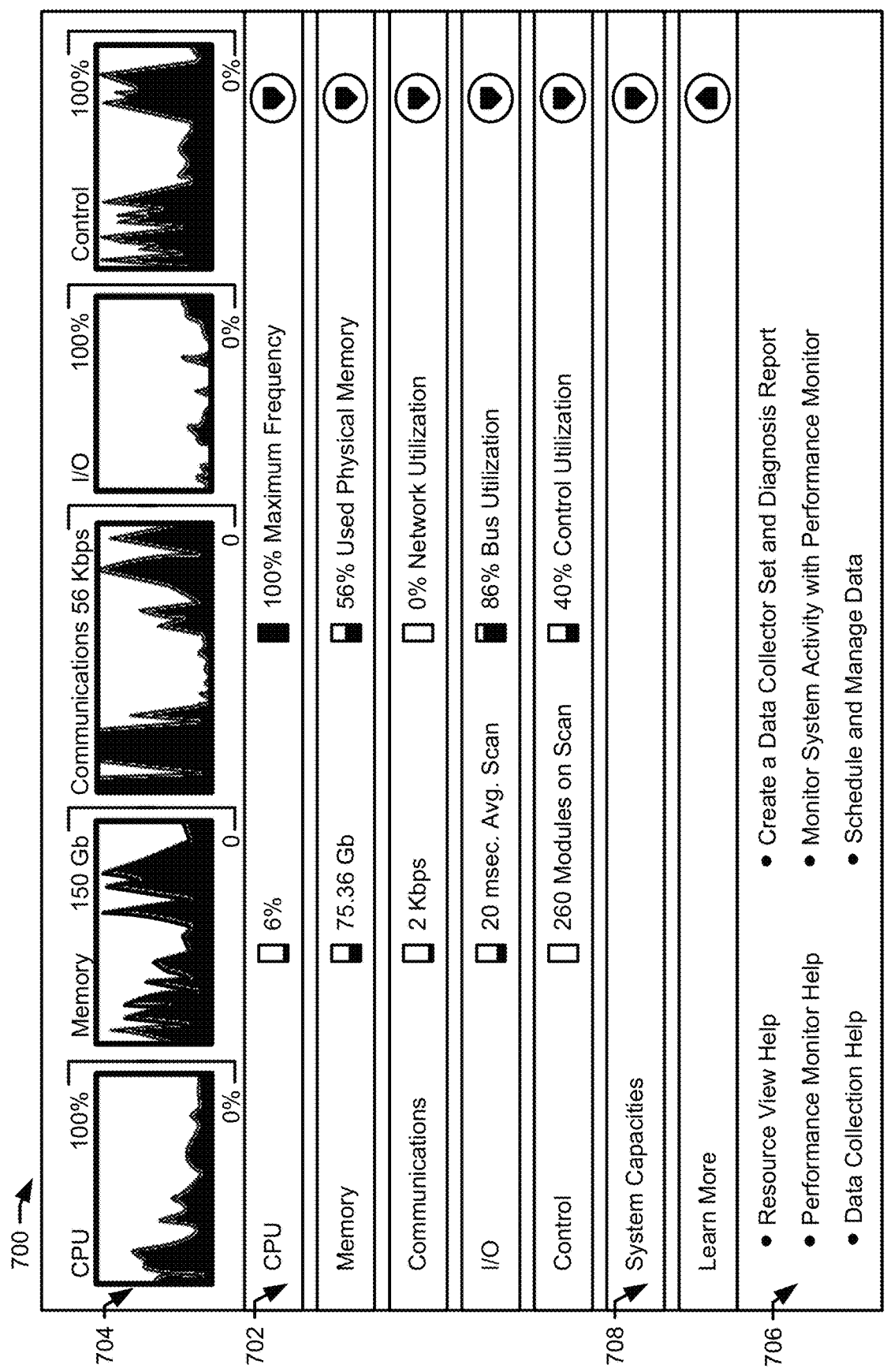

FIG. 7 is another example role-based presentation interface 700 showing relevant key performance metrics and system capacities. The role-based presentation interface 700 includes an example resources tab 702 with a corresponding example chart 704. In the illustrated example, the resources tab 702 is in a collapsed state. In contrast, the example resources tab 706 (e.g., a "Learn More" tab) in the role-based presentation interface 700 is in an expanded state.

The example role-based presentation interface 700 also includes an example resources tab 708 that is also in the collapsed state. The resources tab 708 provides information regarding system capacity for the selected object (e.g., a controller). When in the expanded state, the resources tab 708 displays information to the user regarding the system hardware/configuration against documented system fences. System fences limit the number of resources that may be attributed to an object. For example, a system fence for a controller may assign the maximum number of modules configurable for the controller. In some such examples, the system capacity information for the controller may display the number of modules currently configured for the controller. In some examples, the resource tab 708 may display a chart (e.g., a bar chart) of the data to help visualize capacity utilization. In some examples, the system capacity information displayed may be color coded according to capacity tiers. For example, when the number of modules is less than 75 percent of the system fence (e.g., the maximum number of modules configurable for the object), the display is green. In contrast, when the number of modules is greater than 90 percent of the system fence, the display may be orange.

In addition, the system capacity information displayed in the role-based presentation interface 700 may vary depending on the user. For example, the role-based processor 102 of FIGS. 1 and 2 may, for example, filter out the system capacity information for an object that is less than 75 percent of the capacity by default.

Example process and platform for generating role-based views

Figure 8:
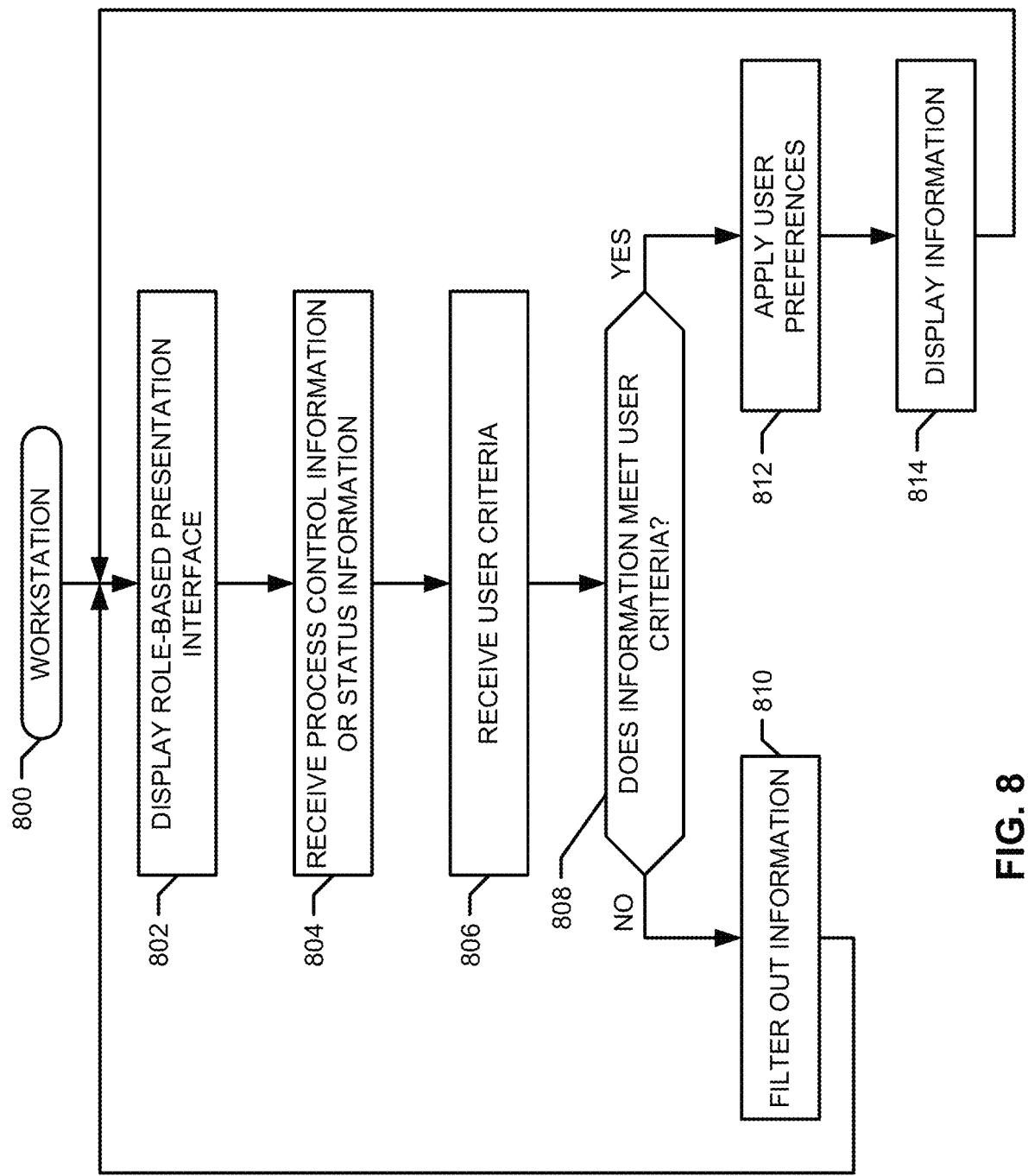
FIG. 8 is a flowchart of an example process for implementing the example workstation of FIGS. 1 and 2.

FIG. 8 is a flowchart representative of an example process for implementing the example workstation 106 of FIGS. 1 and/or 2. The example process of FIG. 8 may be carried out by one or more processors, one or more controllers and/or any other suitable one or more processing devices. For example, the process of FIG. 8 may be embodied in coded instructions (e.g., computer readable instructions) stored on a non-transitory machine/computer accessible or readable medium such as a flash memory (e.g., a "thumb drive"), a ROM and/or random-access memory RAM associated with a processor (e.g., the example processor 902 discussed below in connection with FIG. 9). As used herein, the term non-transitory computer readable medium is expressly defined to include any type of non-transitory computer readable storage (and to exclude propagating signals), or any other storage media in which information is stored for any duration (e.g., for extended time periods, permanently, brief instances, for temporarily buffering, and/or for caching of the information).

Alternatively, some or all of the example operations of FIG. 8 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the operations depicted in FIG. 8 may be implemented manually or as any combination of any of the foregoing techniques, for example, any combination of firmware, software, discrete logic and/or hardware. Further, although the example process of FIG. 8 is described with reference to the flowchart of FIG. 8, persons of ordinary skill in the art will readily appreciate that many other methods of implementing the example process of FIG. 8 may be employed. For example, the order of execution of the blocks may be changed, and/or some of the blocks described may be changed, eliminated, sub-divided, or combined. Additionally, any or all of the example operations of FIG. 8 may be carried out sequentially and/or carried out in parallel by, for example, separate processing threads, processors, devices, discrete logic, circuits, etc.

The process of FIG. 8 begins at block 800 with a workstation (e.g., the example workstation 106 of FIG. 2) running a role-based processor (e.g., the example role-based processor 102 of FIG. 2) to display a role-based presentation interface (e.g., the example role-based presentation interface 210 of FIG. 2) at block 802. At block 804, the role-based processor 102 receives process control information and/or status information.

At block 806, the role-based processor 102 receives user criteria for determining whether to display or filter out information. For example, user criteria may be based on an organizational role or responsibilities of a user. In other examples, user criteria may correspond to certain types of objects, facets of information regarding objects, and/or relationships between objects. For example, asset or node descriptor information for a node may be displayed on a role-based presentation interface, while logic information relating to the node may be filtered out by the role-based processor 102. In some examples, when a user accesses the workstation 106, the user logs into an account and initiates a session, which is associated with a user role (e.g., as defined by a user manager software application). In some such examples, the role-based processor 102 receives default user criteria based on the organizational role and/or responsibilities of the logged in user.

At block 808, the role-based processor 102 determines whether the information meets the user criteria. For example, the role-based processor 102 may use the user role to compare the information to a list of qualifying information associated with the user role. In some examples, the list of qualifying information is stored in a data structure (e.g., a lookup table) in a memory (e.g., the example main memory 202 of FIG. 2). When the information does not qualify, control proceeds to block 810, and the information is filtered out by the role-based processor 102. In addition, the role-based processor 102 generates and/or updates the role-based presentation interface 210 based on the determination made at block 808. Control then returns to block 802 to display the updated role-based presentation interface 210.

Otherwise, when role-based processor 102 determines the information does qualify at block 808, control proceeds to block 812, and the role-based processor 102 applies any user preferences atop the qualifying information. For example, the user may prefer certain visualizations (e.g., information displayed as a table rather than in a pie chart). In some examples, the user preferences may override displaying qualifying information. For example, a production manager who prefers to indirectly monitor an asset (e.g., a valve), may set a user preference to hide information regarding the valve by default. In some such examples, the user preference to hide (or not display) certain information overrides displaying qualifying information regarding the valve. At block 814, the role-based processor 102 displays the information. In addition, the role-based processor 102 generates and/or updates the role-based presentation interface 210 based on the determination made at blocks 808 and 812. Control then returns to block 802 to display the updated role-based presentation interface 210.

Figure 9:
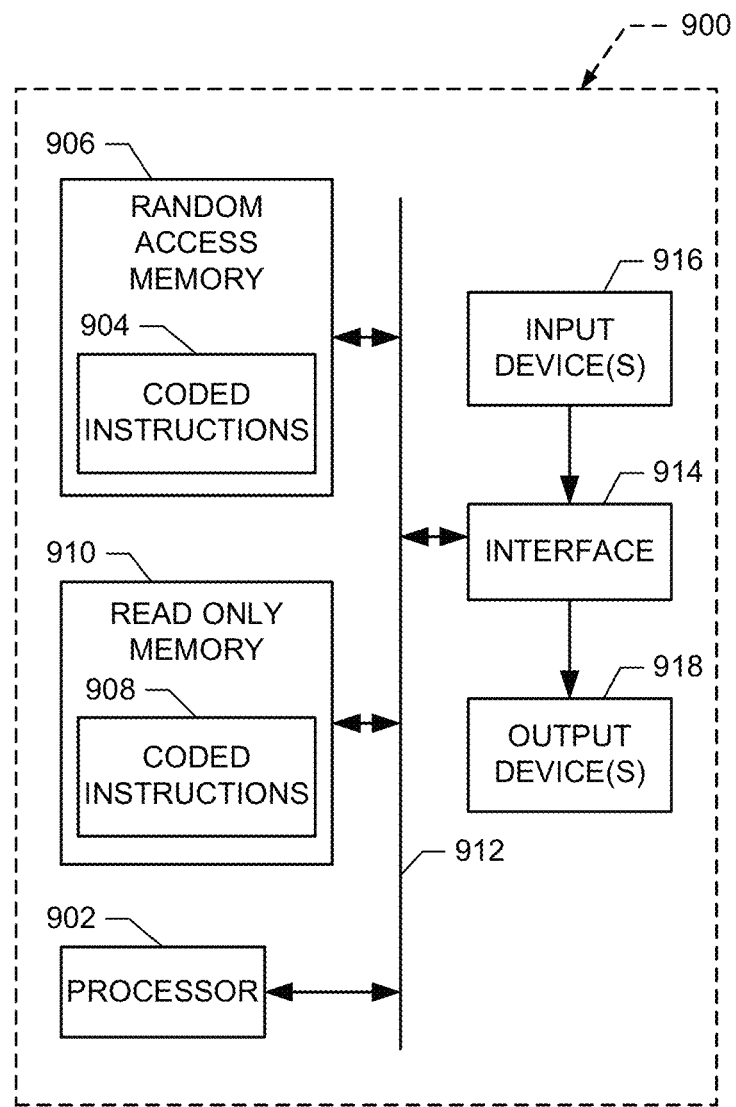
FIG. 9 is a schematic diagram of an example processor platform that may be used and/or programmed to carry out the example process of FIG. 8 and/or, more generally, to implement the example workstation of FIGS. 1 and 2.

FIG. 9 is a schematic diagram of an example processor platform 900 that may be used and/or programmed to carry out the example process of FIG. 8 and/or, more generally, to implement the example workstation 106 of FIGS. 1 and 2. For example, the processor platform 900 can be implemented by one or more general purpose processors, processor cores, microcontrollers, etc.

The processor platform 900 of the example of FIG. 9 includes at least one general purpose programmable processor 902. The processor 902 executes coded instructions 904 and/or 908 present in main memory of the processor 902 (e.g., within a RAM 906 and/or a ROM 910). The processor 902 may be any type of processing unit, such as a processor core, a processor and/or a microcontroller. The processor 902 may execute, among other things, the example process of FIG. 8 to implement the example operator stations 104 described herein. The processor 902 is in communication with the main memory (including the ROM 910 and/or the RAM 906) via a bus 912. The RAM 906 may be implemented by DRAM, SDRAM, and/or any other type of RAM device, and the ROM 910 may be implemented by flash memory and/or any other desired type of memory device. Access to the memories 906 and 910 may be controlled by a memory controller (not shown).

The processor platform 900 also includes an interface circuit 914. The interface circuit 914 may be implemented by any type of interface standard, such as a USB interface, a Bluetooth interface, an external memory interface, serial port, general purpose input/output, etc. One or more input devices 916 and one or more output devices 918 are connected to the interface circuit 914. The input devices 916 and/or output devices 918 may be used to, for example, provide the role-based presentation interface 210 to the example output device 216 of FIG. 2.

Example menus pivoted according to a role-based perspective

Figure 10:
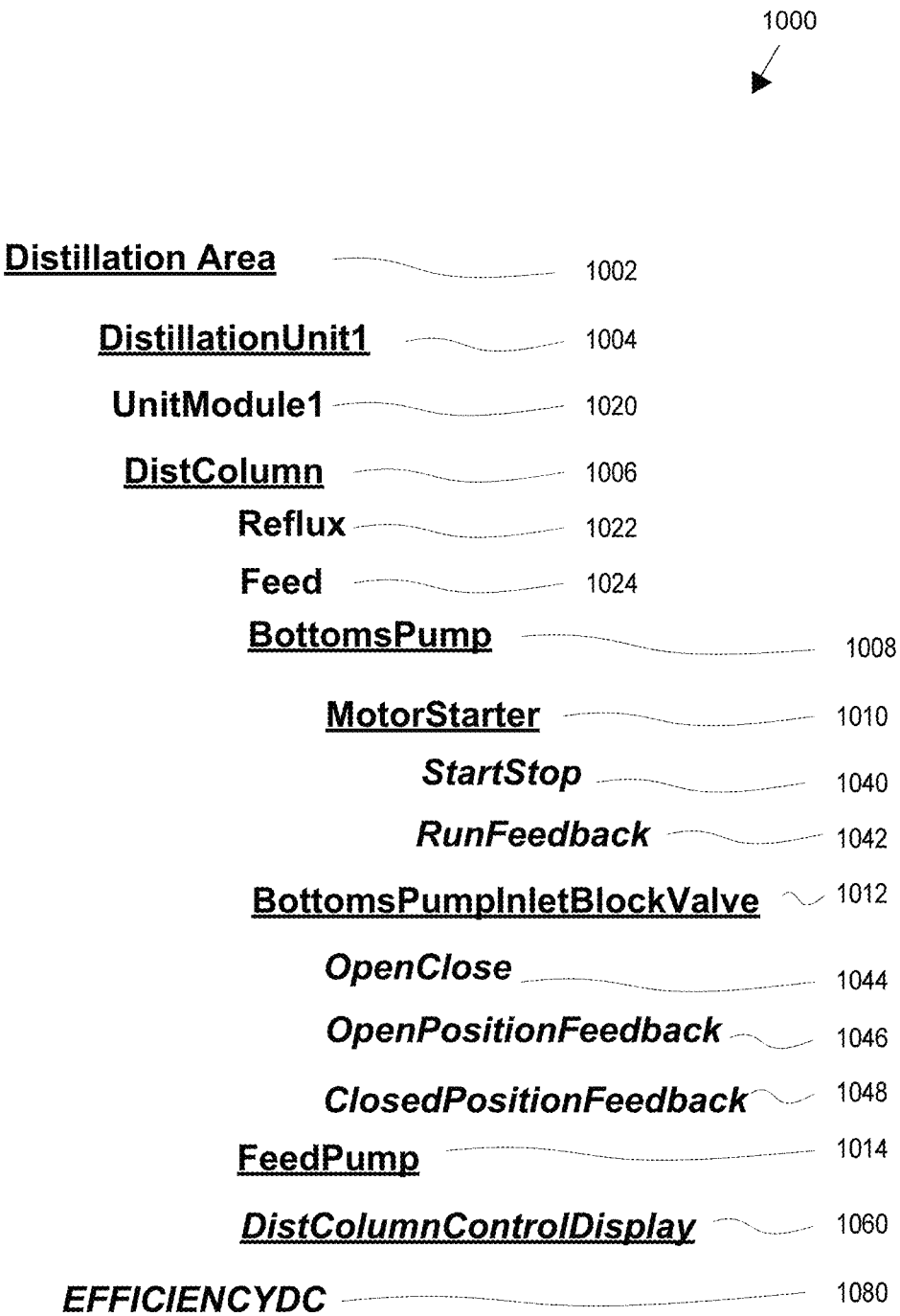
FIG. 10 is a diagram of an example hierarchical menu organized in accordance with an asset-centric perspective, which can be displayed via the workstation of FIG. 1.

FIG. 10 schematically illustrates an example hierarchical menu 1000, which the role-based processor 102, or another suitable software component, can generate to provide an asset-centric perspective of a certain distillation area (which can a part of the process control system 104, for example). More particularly, the role-based processor 102 can generate an interactive presentation of a combined hierarchy that includes assets such as process equipment, I/O points, logic, visual resources, etc., which is "pivoted" to illustrate the perspective of a maintenance technician, for example, or another user particularly interested in assets available in the process control system 104. The menu 1000 shall be contrasted with the menu 1100 illustrated in FIG. 11, which also provides another view of a distillation area.

Generally speaking, pivoting a menu around a certain selected category of items or resources can include organizing items around the selected category, selecting a particular level of detail for one or more branches of the menu, providing visual emphasis to different items of the menu, applying different color or other styling parameters to different item, etc. The role-based processor 102 can utilize some categories of items in multiple views. For example, the role-based processor 102 can utilize plant areas, units, and process cells in both asset-centric and logic-centric presentations of the menu.

In the menu 1000, items 1002-1014 correspond to assets, items 1020-1024 correspond to logic items, items 1040-1048 correspond to I/O points; item 1060 corresponds to a graphical resource; item 1080 to a Key Performance Indicator (KPI). Because the menu 1000 is pivoted around assets, the items 1002-1014 provide the primary organization of the menu 1000, with the remaining items appearing as being subordinate, or otherwise related to, the respective assets.

While a role has a default primary perspective, such as the asset-centric perspective of FIG. 10, the user in some implementations can change the perspective independently in each instance of a relevant application/view provided by role-based processor 102. Thus, for example, a maintenance technician can change her default (asset-centric) perspective for a selected screen to make the view logic-centric, for example. To this end, the role-based processor 102 can provide appropriate controls such as buttons, pull-down menus, etc.

Figure 11:
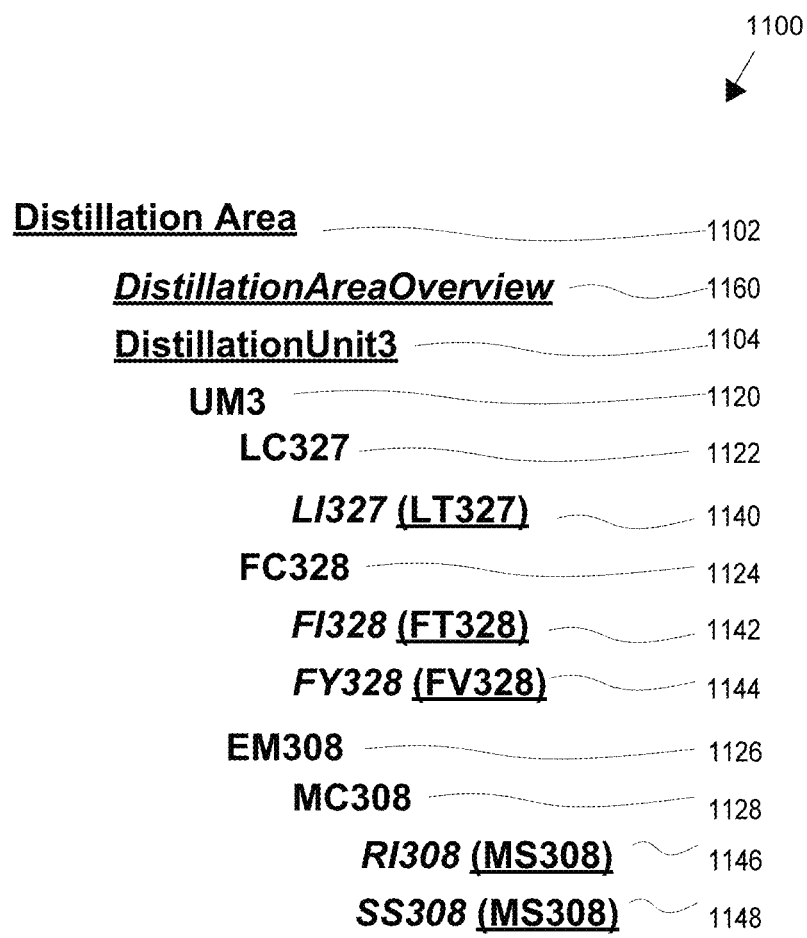
FIG. 11 is a diagram of an example hierarchical menu organized in accordance with a logic-centric perspective, which can be displayed via the workstation of FIG. 1.

FIG. 11 schematically illustrates an example hierarchical menu 1110, which the role-based processor 102 can generate to provide a logic-centric perspective of the same distillation area for which the menu 1100 provides an asset-centric perspective. In the menu 1100, items 1102 and 1104 correspond to assets, items 1120-1128 correspond to logic items, items 1140-1148 correspond to I/O points; and item 1160 corresponds to a graphical resource. Unlike the menu 1000, the menu 1110 includes fewer assets, more logic items, and illustrates the hierarchy primarily in terms the logic items rather than any other types of items.

From the foregoing, it will be appreciated that an interactive menu for a same set of items related to various facets of a process control system can be organized primarily around assets (FIG. 10), around logic items (FIG. 11), or any other category of items.

Further Illustration of Role-Based Filtering

Figure 12:
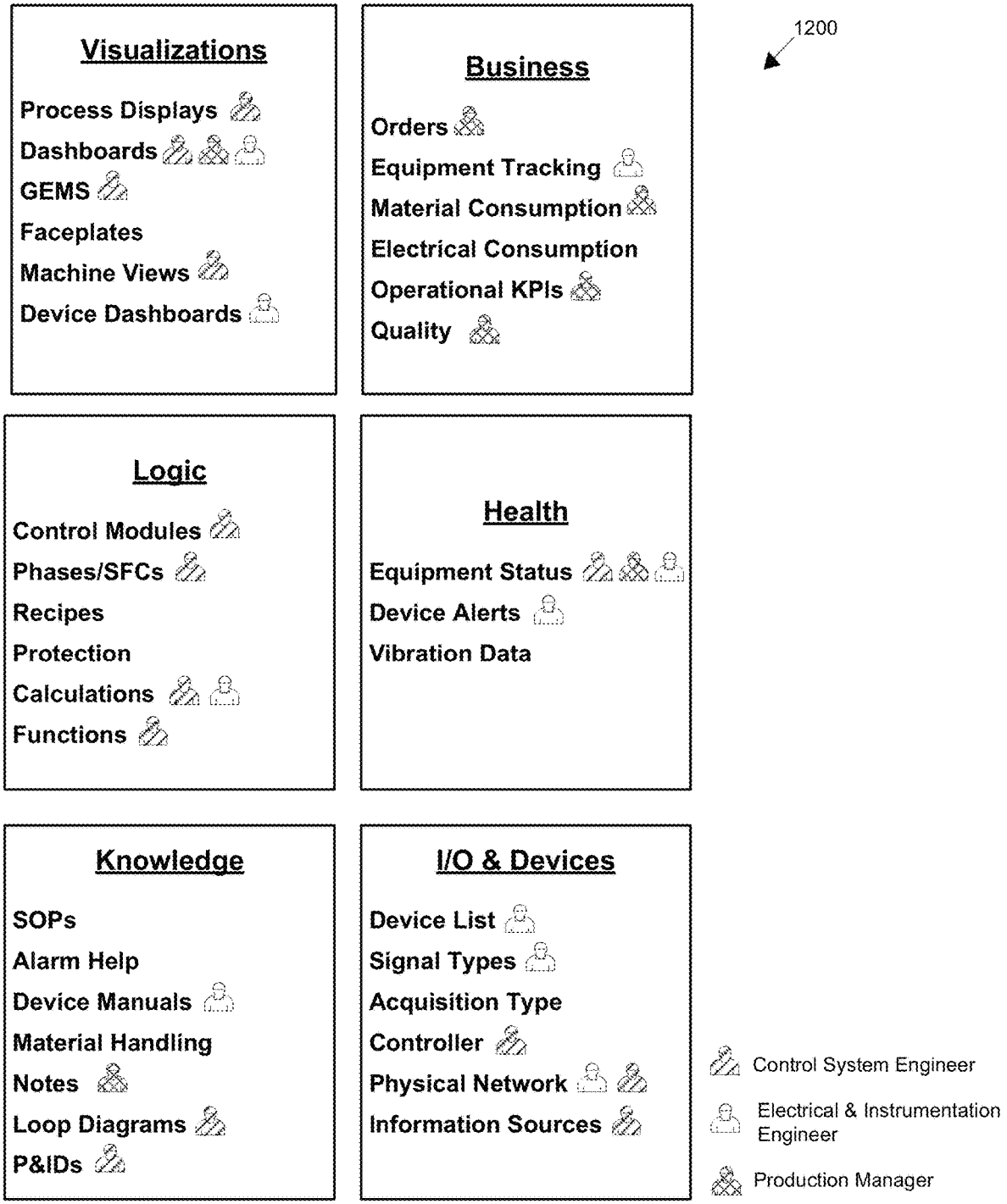
FIG. 12 is a diagram of an example mapping of clusters of information related to a process control system to several organizational roles.

To provide an additional illustration of role-based filtering, a diagram 1200 of FIG. 12 depicts a mapping of clusters of information related to a process control system to several organizational roles. More particularly, the information which the role-based processor 102 can present to a user can include, for example, visualizations, business data, logic, health data, knowledge, and I/O devices. For each type of information, the role-based processor 102 can describe functions, resources, various entities, etc.

The role-based processor 102 can select certain types of data within each of these categories as being most relevant to certain roles. For example, the role-based processor 102 can select process displays for display to a control system engineer, at least as a default option (in at least some of the implementations, the users in other roles can view process displays upon additional request). The role-based processor 102 can select dashboards for each of a control system engineer, an electrical and instrumentation engineer, and a production manager. As also illustrated in FIG. 12, the role-based processor 102 can select machine views for default display to control system engineers only.

Figure 13:
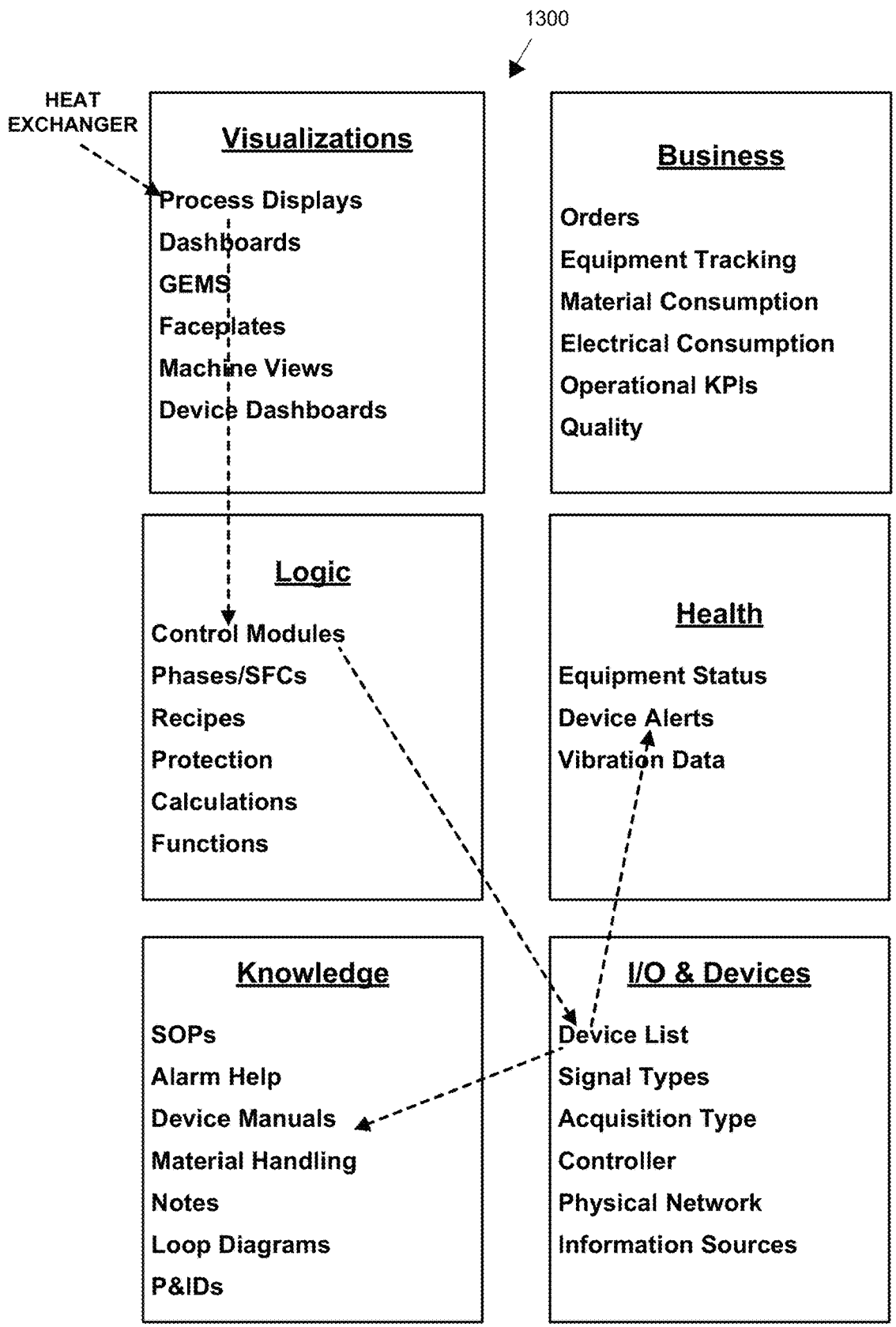
FIG. 13 is a diagram of example role-specific navigation paths between clusters of information related to the process control system of FIG. 1.

Further, the role-based processor 102 can help the user "walk the path" of relationships between types of data. Referring to FIG. 13, the user can specify the context, such as a certain heat exchanger, by initially selecting process display visualization for the heat exchanger. The role-based processor 102 then can automatically suggest a transition to control modules, device list, device alerts, etc., as schematically illustrated in FIG. 13. More specifically, the role-based processor 102 can provide interactive controls for directly linking process display visualization to screens for displaying control modules, device lists, device alerts, etc., so that the user viewing process display visualization for the heat exchanger can immediately see which data is likely to be relevant to the current context of the heat exchanger. In other words, rather than explicitly selecting, for example, device alerts from among equipment status, device alerts, and vibration data items in the Health category, the user can be presented with a shorter list of items, which the role-based processor 102 automatically generates for the current context. Further, the user may not realize that device alerts are potentially relevant to the current context (the heat exchanger), and the role-based processor 102 thus can direct the user toward potentially relevant information.

In general, the role-based processor 102 can implement navigation paths for transitions between screens of information and/or controls, where the navigation paths are specific to users' organizational roles. In this manner, the role-based processor 102 can help the user better understand the "big picture" and relevant information available in the system.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

What is claimed is:

1. A system comprising:
  a display device to depict a user interface for accessing information in a process control system; and
  one or more processors configured to:
    establish a log-in session for a user;
    determine an organizational role of the user, wherein the organizational role includes a set of responsibilities and privileges within an organization associated with the process control system;
    receive, via the user interface, a selection of an object in the process control system;
    receive object information for the selected object in the process control system during the session, wherein the object represents a physical device operating in the process control system;
    determine whether the object information, defining a subset of information available for the object, is qualifying information based on the organizational role of the user;
    display, via a first screen, the object information via the user interface when the object information is qualifying information, wherein the object information is not displayed via the user interface when the object information is not qualifying information, so that different subsets of the information for the object are displayed to two users having different respective organizational roles, the object information defining a context for retrieving further information related to the process control system;
    identify, based on the organizational role and relevance to the context, a navigation path interconnecting a plurality of screens including the first screen, a second screen, and at least one other screen, wherein each of the plurality of screens corresponds to a different respective cluster of information related to the process control system, for the determined organizational role, each of the clusters selected from a group including visualizations, business data, logic, health, knowledge, and I/O devices;
    provide, in the first screen, a control for directly navigating to the second screen from the first screen, wherein the control is not provided to users with organization roles other the determined organization role of the user;
    and transition to the second screen in response to the user activating the control.

2. The system of claim 1, wherein the one or more processors are configured to:
  generate a plurality of role-specific layers, each including a different collection of information from a plurality of sources; and
  select one of the plurality of role-specific layers based on the organizational role of the user, wherein the selected layer includes the object information.

3. The system of claim 1, wherein the organizational role is selected from
  a list that includes (i) a production manager, (ii) a maintenance manager, (iii) a control system engineer, (iv) an electrical and instrument engineer, and (v) a control room operator.

4. The system of claim 1, wherein the one or more processors are
  configured to determine whether the object information is qualifying information by comparing the organizational role to a list that includes respective qualifying information for each of a plurality of organizational roles.

5. The system of claim 1, wherein the one or more processors are configured to determine whether the object information is qualifying information by comparing the organizational role of the user to a geographical span of control.

6. The system of claim 1, wherein the one or more processors are configured to determine whether the object information is qualifying information by comparing the organizational role of the user to a context-based span of control.

7. The system of claim 1, wherein the one or more processors are configured to arrange the qualifying information based on the organizational role of the user.

8. The system of claim 1, wherein the object is a controller, and wherein the object information corresponds to a number modules currently configured for the controller.

9. The system of claim 1, wherein the processor is to display the object
  information based on a custom visualization.

10. The system of claim 1, wherein the one or more processors are configured to:

select, based on the determined organizational role of the user, one of an asset-centric or a logic-centric presentation of a hierarchical menu of items for an area of the process control system; and
generate the hierarchical menu in accordance with the selected presentation.

11. The system of claim 10, wherein the one or more processors are configured to visually emphasize a portion of the hierarchical menu in accordance with the selected presentation.

12. A method comprising:
providing a user interface for accessing information in a process control system;
establishing, by the one or more processors, a log-in session for a user;
determining, by the one or more processors, an organizational role of the user,
wherein the organizational role includes a set of responsibilities and privileges within an organization associated with the process control system;
receive, via the user interface, a selection of an object in the process control system;
receiving, by one or more processors, object information associated with the object in the process control system during a session, wherein the object represents a physical device operating in the process control system;
determining, by the one or more processors, whether the object information, defining a subset of information available for the object, is qualifying information based on the organizational role of the user;
displaying, via a first screen, object information via the user interface when the object information is qualifying information, wherein the object information is not displayed via the user interface when the object information is not qualifying information, so that different subsets of the information for the object are displayed to two users having different respective organizational roles, the object information defining a context for retrieving further information related to the process control system;
identifying, based on the organizational role and relevance to the context, a navigation path interconnecting a plurality of screens including the first screen, a second screen, and at least one other screen, wherein each of the plurality of screens corresponds to a different respective cluster of information related to the process control system, for the determined organizational role, each of the clusters selected from a group including visualizations, business data, logic, health, knowledge, and I/O devices;
providing, in the first screen, a control for directly navigating to the second screen from the first screen, wherein the control is not provided to users with organization roles other the determined organization role of the user; and
transitioning to the second screen in response to the user activating the control.

13. The method of claim 12, further comprising:
generating a plurality of role-specific layers, each including a different collection of information from a plurality of sources; and
selecting one of the plurality of role-specific layers based on the organizational role of the user, wherein the selected layer includes the object information.

14. The method of claim 12, wherein the organizational role is selected from a list that includes (i) a production manager, (ii) a maintenance manager, (iii) a control system engineer, (iv) an electrical and instrument engineer, and (v) a control room operator.

15. The method of claim 12, wherein determining whether the object information is qualifying information further comprises comparing a user role permission to a permission level for a task.

16. The method of claim 12, wherein determining whether the object information is qualifying information further comprises comparing a user role permission to a geographical span of control.

17. The method of claim 12, wherein determining whether the object information is qualifying information further comprising comparing the user role to a list of qualifying information.

18. The method of claim 12, wherein determining whether the object information is qualifying information further comprises comparing a user role permission to a context-based span of control.

19. The method of claim 12, further comprising arranging the qualifying information based on the user role.

20. A non-transitory computer-readable medium storing thereon instructions that, when executed by one or more processors in a machine, cause the machine to:
establish a log-in session for a user;
determine an organizational role of the user, wherein the organizational role includes a set of responsibilities and privileges within an organization associated with the process control system;
receive, via the user interface, a selection of an object in the process control system;
receive object information for the selected object in the process control system during the session, wherein the object represents a physical device operating in the process control system;
determine whether the object information, defining a subset of information available for the object, is qualifying information based on the organizational role of the user;
display, via a first screen, the object information via the user interface when the object information is qualifying information, wherein the object information is not displayed via the user interface when the object information is not qualifying information, so that different subsets of the information for the object are displayed to two users having different respective organizational roles, the object information defining a context for retrieving further information related to the process control system;
identify, based on the organizational role and relevance to the context, a navigation path interconnecting a plurality of screens including the first screen and a second screen, a second screen, and at least one other screen, wherein each of the plurality of screens corresponds to a different respective cluster of information related to the process control system, for the determined organizational role, each of the clusters selected from a group including visualizations, business data, logic, health, knowledge, and I/O devices;
provide, in the first screen, a control for directly navigating to the second screen from the first screen, wherein the control is not provided to users with organization roles other the determined organization role of the user; and transition to the second screen in response to the user activating the control.

\* \* \* \* \*

UNITED STATES PATENT AND TRADEMARK OFFICE
CERTIFICATE OF CORRECTION

PATENT NO. : 11,774,927 B2  
APPLICATION NO. : 14/574025  
DATED : October 3, 2023  
INVENTOR(S) : Bryan Michael Jones et al.

Page 1 of 2

It is certified that error appears in the above-identified patent and that said Letters Patent is hereby corrected as shown below:

In the Drawings

At Fig. 1, Sheet 1 of 13, "Amomonia" should be -- Ammonia --.

In the Specification

At Column 1, Line 9, "2013," should be -- 2013, now U.S. Pat. No. 10,444,949, --.

At Column 1, Line 45, "a system including to" should be -- to a system including --.

At Column 2, Line 21, "of these of these" should be -- of these --.

At Column 3, Line 1, "in the" should be -- in the injury --.

At Column 3, Line 3, "equipment" should be -- equipment. --.

At Column 6, Line 57, "dislcosure" should be -- disclosure --.

At Column 11, Line 39, "list" should be -- list of --.

At Column 12, Line 40, "FoundationTM" should be -- Foundation™ --.

At Column 13, Line 19, "Extended" should be -- Electronic --.

At Column 13, Lines 29-30, "ManagementTM" should be -- Management™ --.

At Column 14, Line 28, "connection" should be -- connection with --.

Signed and Sealed this  
Twenty-seventh Day of January, 2026

John A. Squires  
*Director of the United States Patent and Trademark Office*

CERTIFICATE OF CORRECTION (continued)
U.S. Pat. No. 11,774,927 B2

At Column 21, Line 64, "can" should be -- can be --.

In the Claims

At Column 24, Line 22, "other" should be -- other than --.

At Column 24, Line 24, "and" should be at Line 23 as a continuation point.

At Column 24, Lines 36-39, "a list that includes ......... room operator." should be at Line 35 as a continuation paragraph.

At Column 24, Lines 42-46, "configured to determine ........ roles." should be at Line 41 as a continuation paragraph.

At Column 24, Line 62, "number" should be -- number of --.

At Column 25, Line 55, "other" should be -- other than --.

At Column 25, Line 62, "collection of information from a plurality of sources; and" should be at Line 61 as a continuation paragraph.

At Column 26, Lines 1-4, "from a list that includes ........ control room operator." should be at Line 67 as a continuation paragraph.

At Column 26, Line 66, "other" should be -- other than --.